United States Patent
Crozier

(10) Patent No.: US 7,162,327 B1
(45) Date of Patent: Jan. 9, 2007

(54) METHOD AND APPARATUS FOR ADAPTIVE COORDINATED DISTRIBUTION OF MATERIALS IN RAILWAY MAINTENANCE AND OTHER APPLICATIONS

(75) Inventor: Trevor Crozier, Regina (CA)

(73) Assignee: Brandt Road Rail Corporation, Saskatchewan (CA)

( * ) Notice: Subject to any disclaimer, the term of this patent is extended or adjusted under 35 U.S.C. 154(b) by 0 days.

(21) Appl. No.: 11/238,827

(22) Filed: Sep. 28, 2005

(30) Foreign Application Priority Data

Sep. 28, 2004 (CA) .................................. 2482709

(51) Int. Cl.
*G06F 7/00* (2006.01)

(52) U.S. Cl. ...................................................... 700/213
(58) Field of Classification Search ................ 700/213
See application file for complete search history.

(56) References Cited

U.S. PATENT DOCUMENTS 6,089,162 A * 7/2000 Madison ........................ 104/2
6,170,401 B1 * 1/2001 Miller et al. ................... 104/9
6,526,339 B1 * 2/2003 Herzog et al. ................ 701/19

* cited by examiner

Primary Examiner—Khoi H. Tran
(74) Attorney, Agent, or Firm—Frost Brown Todd LLC

(57) ABSTRACT

A method of distributing railroad ties or other materials in variable quantities at randomly spaced intervals. GPS coordinates are recorded for individual use locations where ties or materials are required. From the coordinates of these use locations, drop locations are selected at which materials can be conveniently dropped for subsequent use or installation. Capture of the use location coordinates is done by separate equipment from the distribution equipment, so that the data capture and distribution crews can work at their own efficiencies. The apparatus can be built into new railroad equipment or the like, or can also be manufactured in such a fashion as it can be retrofit. Computer software for the optimization and location of the drop locations is also disclosed.

55 Claims, 7 Drawing Sheets

METHOD AND APPARATUS FOR ADAPTIVE COORDINATED DISTRIBUTION OF MATERIALS IN RAILWAY MAINTENANCE AND OTHER APPLICATIONS

This invention relates generally to railway maintenance logistics, and more particularly relates to a GPS-based system for use in the distribution of railroad ties or similar materials along railroad tracks in railroad maintenance applications.

BACKGROUND OF THE INVENTION

Railroads in North America typically consist of a network of railroad tracks. Each of these railroad tracks is typically formed by placing wooden or concrete crossties on top of a bed of gravel ballast, and then attaching a pair of steel rails to the top of those ties. Variations in specific construction methods occur in special function areas such as road and bridge crossings, yards or the like.

One of the major railroad maintenance activities which is undertaken on an ongoing and regular basis is the monitoring and replacement of the crossties beneath the tracks, in order to maintain the integrity and safety of these railroad tracks. While many railroad maintenance tasks have become highly automated over the last number of years, tie replacement is still a task which while being mechanically assisted, is somewhat more labour and logistic intensive in nature at the present time. For example, while there are machines which can be used to in relatively automated or streamlined fashion withdraw and replace individual railroad ties under a track, the actual movement, supply and placement of the ties to be put in place beneath the track remains the difficult portion of the task.

One of the issues which still remains is that there is no efficient or fluid method for the placement of variable numbers of replacement railroad ties in approximate proper position along the railroad right of way for use in replacement activities.

In determining which railroad ties might need to be replaced, a machine can be driven along the track which would exercise some type of mechanical test on each railroad tie or otherwise calculate which tie or ties needed to be replaced and mark them as such. The second method, which is still widely used as well, consists of a track maintenance employee physically walking along the railroad track and, based on visual inspection, marking individual railroad ties that need to be replaced with a paint marking or the like. Once the ties have been marked for replacement, a track gang can then replace the necessary ties in the course of performing maintenance on the track.

Beyond the oldest method of simply walking along or moving along the track with a complete set of equipment, replacing each tie directly as it is inspected, there is not a quick and efficient use of the equipment and crews necessary in these circumstances or applications. As indicated above the most difficult portion of the task of railroad tie replacement in terms of logistics is the distribution of the replacement ties along the railroad right of way so that they can be properly installed by the maintenance crew.

Automatic tie replacement machines can carry very few if any supplies of replacement ties. The majority of those machines are designed to basically replace a tie under the track with a new tie which is picked up from the ground beside the track and installed in position. In certain cases what might have been done in the past to distribute the proper number of replacement ties would be to effectively bring along a truckload or a train load of replacement ties behind the tie replacement machine and use a tractor or the like to drop the ties into approximate position before the tie replacement machine was there to make that particular replacement. However, this makes the actual tie replacement process take longer than if the replacement ties are already in place on the ground beside the track and can simply be picked up in the appropriate position and installed.

One of the methods of distribution of replacement ties rather than bringing along an entire train load of replacement ties with the tie replacement machine has in the past been to effectively come along the track after the ties have been marked for replacement and drop ties in approximate position where they will be used by the following maintenance equipment or tie replacement machine. A distribution crew working separately from the actually tie replacement crew can work more efficiently, as can the replacement crew, if the two jobs are not directly combined or done at the same time.

In circumstances where a large number of ties is required in an area for replacement, that number of ties needs to be dumped beside the track for use by the crew, whereas in other circumstances where fewer ties are required a smaller number of ties might need to be dumped for use, or on a section of track where no tie replacement was required to be done at all, then no replacement ties would be needed for a distance.

Beyond simply dumping replacement ties in approximately the right numbers and approximately the right places, another method which has been practised in the past is to drop a predefined batch or number of ties, or a banded quantity of ties, along the railroad. For example, it is known that certain railroad maintenance companies have banded replacement ties together in groups of 15 (or some other predetermined number), and then they simply count their way along the replacement markings on the track and drop those banded batches of ties along the track in approximately the right place so that they are in position when they are required for use. However, the cost of preparing these banded groupings of ties is significant, and when the replacement ties are banded into these predefined lots they also present somewhat of a limitation insofar as limiting where and how many batches of ties can be distributed, since they can only be distributed in multiples of 15 or whatever the predetermined number is which is in each banded group. This banding approach does save significantly on the time and labour involved in the actual tie distribution process, however the cost of the banding step is significant.

Something which has been done in the past to enhance the banding method is to effectively capture GPS coordinates for each tie which needs to be replaced, and then generating a signal or somehow marking for action the dropping of one of these predefined batches or numbers of ties as necessary. For example, if the ties were batched in units of 15, a marking or location is captured or marked every 15th replacement tie being required, and then a banded number of ties is dropped at that point. However, the ties will be dropped in a large batch at either the beginning or end of a replacement section, and in a particular section of track where not a large number of replacement ties were required, the 15th tie might be a long ways from the first tie needing to be replaced and as such the problem of needing to move the replacement ties around a fair bit for installation then resurfaces.

It is also known that in certain circumstances where this banded approach has been used, the marking crew who are responsible for marking the locations for the dropping of various items and replacement ties need to work in very close physical proximity to the tie distribution crew. This is a significant rate limiting step for the marking crew, since they would not typically spend nearly as much time on a particular section of track testing or identifying ties for replacement as would the maintenance crew who were actually undertaking the job of distribution or replacement. In addition to trying to eliminate the banding system, if it were possible to come up with a method by which the marking crew could work at their own speed independently from the maintenance crews, this would also minimise the cost of the railroad tie replacement task.

Because railroads typically are required to maintain hundreds or thousands of miles of railroad tracks on a recurring basis, tie replacement is a major component of track maintenance. Anything that can be done to streamline the tie replacement process in terms of equipment, materials, traffic control, labour and management would enhance profitability of railroads since tracks would be down for shorter periods of time for maintenance and less cost potentially would be involved in the actual maintenance step. It is contemplated that any type of system which could be created which would enhance the tie replacement function by allowing for the distribution of variable predetermined numbers of replacement ties in close to the right locations along a railroad right of way would be welcome as an optimisation of the tie replacement function of railroad maintenance.

SUMMARY OF THE INVENTION

It is the object of the present invention to provide a method and apparatus for the adaptive distribution of random quantities of railroad ties at randomly spaced locations along a railroad right of way with a minimum of labour or cost.

It is a further object of the present invention to provide a method or apparatus by which these variable quantities of replacement railroad ties can be placed at non-standard or calculated locations where they are optimally located in relation to their eventual use in maintenance or replacement tasks.

It is the further object of the present invention to provide a method and apparatus for the adaptive distribution of railroad ties in railway maintenance applications which will allow for the marking or acquisition of the use location data with respect to these ties, to take place in a separate site inspection pass in advance of the equipment for distributing or replacing the railroad ties.

A method for the adaptive distribution of materials and railway maintenance and other applications, and more specifically for the distribution of replacement railroad ties in the present case, accomplishes its objectives as follows. The method of the present invention is "adaptive" insofar as it can automatically and correctly calculate and adjust the right number of replacement ties to be placed at particular spots along a railroad right-of-way for eventual replacement, such that not only the number of ties distributed at individual drop locations will vary, but also the specific locations for the dropping of those materials will be adjusted based upon the proximity or use requirements for the materials in question.

The invention includes a method of distribution of materials along a railroad track, the first step in which is, with respect to a section of railroad track, identifying at least one use location in proximity to the railroad track at which a quantity of materials is required to be used. The use location or locations might be anywhere that a quantity of materials would need to be placed for subsequent use.

The use location or locations would be identified using at least one drop location detection module capable of communicating with a central location database and capable of determining the location of the drop location detection module in relation to the railroad track, determining and capturing the coordinates of each use location in relation to the railroad track. The use location capture module or modules would capture the coordinates of each use location, along with potentially the quantity of materials required at that location or any other optional desirable data, for storage to a central location database. The connection of the use location capture modules to the central location database might be real-time and 'always on', or the modules could from time to time be uploaded to the central location database.

Next a location selection software component would be used to determine the proper siting of drop locations for the materials in question, based upon the use location coordinates stored within the central database as well as a profile of rules relating to the optimized distribution of the materials in question. The location selection software component, which might be resident upon the use location capture module, the drop location detection module or modules, or a central computer added for this or other purposes, would select at least one drop location at which materials can be placed in proximity to the railroad track, wherein each drop location corresponds to at least one use location from the central database in relation to the railroad track in question and wherein each use location from the central database in relation to the railroad track in question corresponds to a drop location. The coordinates in relation to the railroad track for each drop location, being drop location coordinates, would be determined as would be the appropriate quantity of materials to be placed at each drop location, being the drop location quantity, wherein the drop location quantity for a particular drop location denotes a sufficient quantity of material to meet the requirements at each use location to which the drop location in question corresponds.

Next the materials could actually be distributed, using materials distribution equipment equipped with a drop location detection module capable of communicating with the central location database, and capable of determining the location of the drop location detection module in relation to the railroad track. While moving the materials distribution equipment along the railroad track, the drop location detection module would monitor the location of the drop location detection module in relation to the railroad track and compare the location of the drop location detection module to the drop location coordinates in respect of drop locations along the railroad track selected by the location selection software component. When it is determined that the drop location detection module has reached a drop location, the placement of the drop location quantity of materials at the drop location could take place.

The drop location coordinates and drop location quantities could be stored in the central location database along with the use location coordinates or other data, or could be calculated in memory and used by the drop location detection module or modules and discarded rather than retained in the central location database. While the obvious utility for historical purposes of retaining the drop location information will be understood, either such implementation of the method of the present invention is contemplated within the scope hereof.

The location selection software component might be resident upon and the drop location coordinates and drop location quantities calculated by the device on which the central location database is resident. The central location database could be resident on the drop location detection module, and the drop location detection module capable of communicating with the drop location detection module to access data from the central location database. Alternatively the central location database could be resident on the drop location detection module, and the drop location detection module capable of communicating with the drop location detection module to access data from the central location database. The central location database could also be resident on a central computer, wherein both the drop location detection modules and drop location detection modules are capable of communicating with the central computer for the purpose of communicating with the central location database.

The drop locations could be selected and the drop location coordinates and drop location quantities saved to the central location database in advance of the actual materials distribution step, or alternatively they could be computed in real time as the materials distribution equipment moves down the railroad track.

The use location capture module could be equipped with a GPS receiver, so that the coordinates of a use location would effectively be a GPS fix at the time the use location coordinates were captured. Alternately as is outlined herein there are other methods of measurement or determination of the location of a use location in relation to the railroad track, including measuring the distance along the track from a fixed point, or counting a repetitive track feature, which could also be used.

Similarly once drop locations are selected, the drop location coordinates could be generated in whatever format would be usable by the drop location detection modules. For example if the location detection modules had a GPS receiver in them the drop location coordinates might be a set of GPS coordinates. Alternatively if the drop location detection module were equipped to measure the distance along the track from a fixed point to determine the location of the module, then the drop location coordinates could be generated for this type of a measurement method.

It is even foreseeable that multiple measurement methods might be used and the location selection software component could be used to translate between the two. For example, GPS use location coordinates could be used to select the drop locations, the drop location coordinates of which could be determined or calculated for detection by measurement along the track or using some other method.

The method could also be used to distribute more than one type of materials—the use location capture module could be modified to allow for the marking of particular use locations for the distribution of one or more specific types of materials and this again could be incorporated into the selection of the appropriate drop locations.

If the materials being distributed were railroad ties, the materials distribution equipment could include a picker arm for removal of such replacement ties from a transport railcar for placement at use locations. There might also be a load cell on the picker arm capable of measuring the number of ties removed from the railcars at one time.

The materials being distributed could either be dropped automatically by the materials distribution equipment upon the determination by the drop location detection module that the equipment has reached a drop location, or alternatively the materials could be distributed manually upon the arrival of the materials distribution equipment at a drop location. In a manual distribution, the operator of the materials distribution equipment could be notified when the drop location detection module has determined that the materials distribution equipment has reached a drop location.

Where the materials distribution equipment comprised a longer supply train or the like, the drop location detection module could also include a slave display on the power unit of the distribution equipment, to advise the operator of the power unit when the distribution equipment is in position at a drop location in addition to advising the operator of the distribution equipment.

The use location capture module could be adapted to allow the operator to specifically choose some drop locations if they wished to do so, or alternately to specify places which should not be used as drop locations.

There is also disclosed a system for use in the adaptive distribution of variable quantities of materials along a railroad track, comprising firstly a central location database capable of storing the coordinates in relation to the railroad track of use locations at which materials are required for use. The system also includes at least one drop location detection module which is able to determine its coordinates in relation to the railroad track and capture said coordinates as use location coordinates corresponding to a use location, and wherein said drop location detection module is capable of communicating with the central location database for the purpose of storing use location coordinates therein.

A location selection software component which will select drop locations in proximity to the railroad track at which materials are to placed and will determine the coordinates of such drop locations in relation to the railroad track, being drop location coordinates, along with determining the quantity of materials to be placed at each drop location, being drop location quantities, is used in the system to determine precisely where quantities of materials should be placed. At least one piece of materials distribution equipment equipped with a drop location detection module capable of communicating with the central location database to access location coordinates stored thereon as well as being capable of determining its own position in relation to the railroad track, will be moved along the track and as it determines that a drop location has been reached it will either notify the operator for a manual material drop or automatically dispense the materials required in other embodiments.

In operation of the system, use location coordinates of use locations in relation to the railroad track will be captured to the central location database by the at least one drop location detection module. The location selection software component will select drop locations and generate the drop location coordinates and drop location quantities corresponding thereto based upon use location coordinates and a profile of rules pertaining to the optimal distribution of the materials in question and the drop location detection module on the materials distribution equipment will access the drop location coordinates and drop location quantities in respect of the railroad track and monitor or compare the location of the drop location detection module in relation to the railroad track against the drop location coordinates as the materials distribution equipment is moved along the railroad track, and upon determining that a drop location has been reached the materials distribution equipment will place the required drop location quantity of materials at that drop location.

The system might also include a central computer in which the central location database is resident, said central computer being capable of communicating with the at least one drop location detection module as well as with the at least one drop location detection module.

As outlined with respect to the method above, the system of the present invention could use GPS or track measurement methods to determine the location of either the use location capture module or the drop location detection module in relation to the railroad track and to capture the coordinates or measurements re same.

Also included in the invention is a location selection software component, which is a computer program capable of applying a set of predetermined rules in either a static or fuzzy context to a list of use location coordinates and data stored within a central location database, to yield properly selected drop locations in proximity to the railroad track along with the necessary coordinates to detect or locate them using a drop location detection module.

Also within the scope of the present invention is the use location capture module itself which is any device capable of capturing the measurement or location of a use location in relation to the railroad track and storing it for subsequent upload to a central location database or other use in accordance with the method of the present invention.

Also within the scope of the present invention is any drop location detection module capable of locating drop locations for quantities of materials along or in proximity to a railroad track as the module is moved along the railroad track, in accordance with drop locations and their drop location coordinates and drop location quantities determined by the location selection software program of the present invention.

In addition to the overall method of acquiring the data related to the use locations, selecting the appropriate drop locations and subsequently locating the drop locations and dropping or distributing an appropriate amount of materials at each drop location, the invention also comprises a computer program for the actual generation of drop location co-ordinates based upon an assessment or analysis of a plurality of use location co-ordinates. Specifically, it is intended that a computer program which can take a plurality or use location co-ordinates along with the general route information and other GIS or business factors into account and, on that basis, properly select the most convenient or efficient drop locations for materials be used, and generate the appropriate drop location co-ordinates therefor, is contemplated within the scope of the present invention as well.

The use location capture module in its most basic embodiments will be any device or apparatus capable of effectively marking and caching to memory sets of GPS co-ordinates which relate to individual use locations for replacement ties. These use location co-ordinates can subsequently either be manipulated within the memory of the use location capture module or uploaded either to a central computer or directly to a drop location detection module on a distribution machine for subsequent manipulation or use in the location of appropriate drop location co-ordinates and the subsequent distribution of materials thereto.

A central computer could be used to house all of the use location co-ordinates captured by the one or more use location capture modules of the method of the present invention. Basically, the use location capture modules could upload to the memory of a central computer, and more specifically into a location database stored therein, the use location co-ordinates which had been captured by use of the use location capture module(s) and then subsequently those use location co-ordinates could be used by the central computer, or more directly by a drop location detection module on a tie distribution machine, to properly calculate or locate drop locations and assist operators of the tie distribution equipment in the distribution of appropriate numbers of replacement ties or other materials at each such location.

The method of the present invention could either use a central computer or the use location co-ordinates could be stored directly in the use location capture module or the drop location detection module. For example, while one of the elements of the present invention is that use location capture module and drop location detection module are physically separate equipment so that the operator of the use location capture module does not have to operate in close proximity to the distribution equipment and drop location detection module attached thereto, it may be the case that in certain circumstances it is decided to implement the method of the present invention using either a use location capture module or drop location detection module which itself had the appropriate memory and computational characteristics to maintain a database of some type of all of the necessary use location co-ordinates and be able to calculate the proper location or co-ordinates of drop locations based thereon. I will be understood that either the use of a central computer to house and receive this information from use location capture modules and subsequently download that information to the drop location detection modules of one or more sets of distribution equipment, or alternatively the housing of that data directly on the use location capture module or the drop location detection module with the removal of the central computer from the method or apparatus, are both contemplated within the scope of the present invention.

Data stored in the location database in addition to the use location co-ordinates for individual replacement ties could be used for unrelated data analysis or historical purposes. As outlined above, the necessary software components to analyze the contents of the location database for the purpose of properly locating and calculating the co-ordinates of drop locations for varying quantities of railroad ties or other materials are also specifically contemplated within the scope of the present invention, both in terms of their overall method and apparatus as well as a separate business method or software embodiment.

The actual methodology used to determine the appropriate location of individual drop locations could take one of at least three forms. In the most basic embodiment, drop locations could be selected based on individual sets of use location co-ordinates, such that there was an individual drop location and set of drop location co-ordinates created to correspond to each individual use location and its related use location co-ordinates. The second method which could also be used would be to effectively select drop locations at which to drop multiple quantities of railroad ties based on comparison of the individual use location co-ordinates of the ties needing to be replaced such that the optimum location for dropping of multiple ties could be selected. For example, if a number of close or adjacent co-ordinates were held in the location database it may be the case that it was optimal to generate a single drop location and set of drop location co-ordinates in the centre of the are of those particular use location co-ordinates and basically indicate to the operator of the distribution equipment the proper number of ties, equipment or material to be dropped at that location.

The third and most adaptive method of selection of drop locations would likely be some combination of the two outlined above, wherein individual ties that were further apart could be equated to individual drop locations of their own, and locations where there were a multiplicity or plurality of adjacent locations would result in the generation of a single set of drop location co-ordinates at which a multiple number of ties could be dropped.

Various types of user interfaces can be contemplated for a drop location detection module, with varying degrees of complexity.

The tie distribution equipment or machinery itself may be further equipped with a load cell or some other method of counting the ties which have actually been distributed, in order to provide comparative data to the operator of the machine and/or provide effectively a method of counting the ties which have been distributed for comparison to the required numbers.

It is also contemplated that either a slave display or a more elaborate secondary drop location detection module could be used in the power unit or locomotive of the train or equipment used to distribute the replacement ties and, effectively, what the slave display or the secondary drop location detection module would do would be to identify to the operator of the locomotive, who would in all likelihood be a second operator from that of the distribution equipment, when the distribution equipment was properly located at the co-ordinates of a drop location so that the train could be stopped in the appropriate place for the operator of the actual distribution equipment to drop the required number of ties. Either the use of a simple secondary display slaved to the primary marking module used in the distribution equipment could be contemplated, or a separate GPS enabled secondary drop location detection module which would either, based on communication with the primary drop location detection module or alternatively by virtue of some manual setting, apply the appropriate distance offset to the co-ordinates in question could also be used to properly locate the train in relation to the distribution equipment at the drop locations.

The equipment of the present invention could either be built into new railroad maintenance equipment or could be built in such a fashion that it could be retrofitted to existing equipment. With respect to the use location capture module, for example, that could be built into some type of a track evaluation device or some other device or vehicle which is used by a track maintenance employee to assess and identify ties to be replaced. Alternatively, that could be built as some sort of a portable or handheld module where track employees still walked along the track to identify ties to be replaced.

Similarly, the drop location detection module to be used in the tie distribution equipment could either be built into the cab electronics of the equipment in question or could alternatively be built in a retrofittable fashion.

DESCRIPTION OF THE DRAWINGS

While the invention is claimed in the concluding portions hereof, preferred embodiments are provided in the accompanying detailed description which may best be understood in conjunction with the accompanying diagrams, where like parts in each of the several diagrams are labelled with like numbers, and where:

DETAILED DESCRIPTION OF THE ILLUSTRATED EMBODIMENTS

Figure 1:
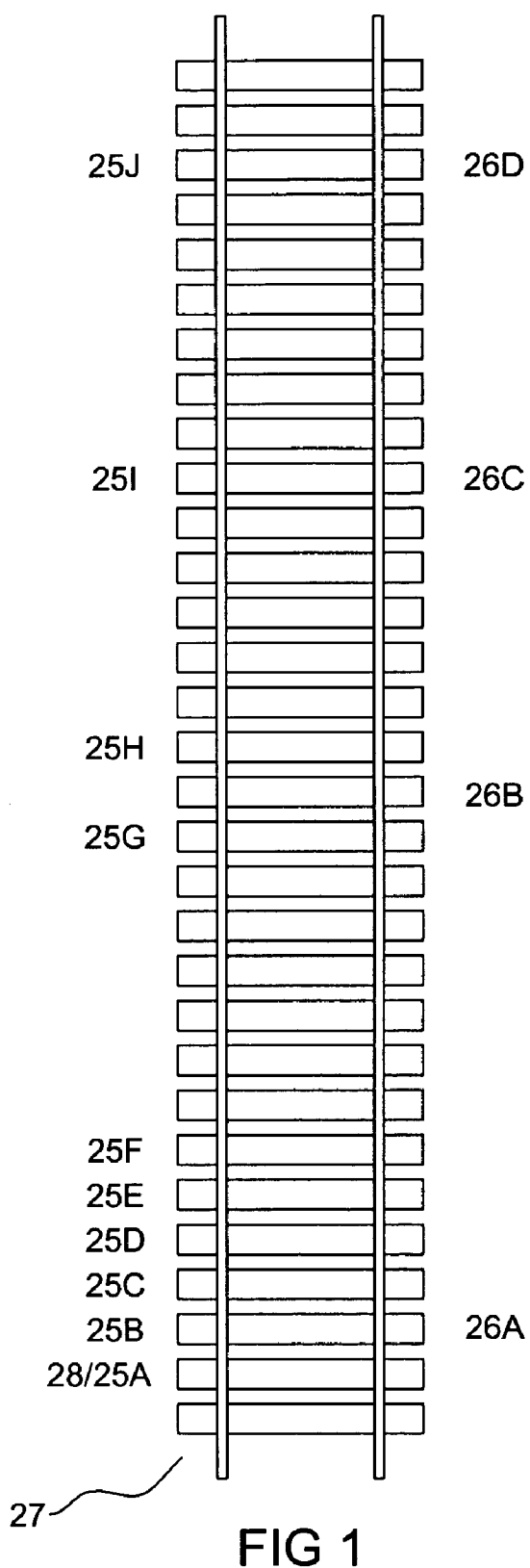
FIG. 1 is a diagram showing the profile of a section of railroad track in which a plurality of railroad ties require replacement.

As required, detailed embodiments of the present invention are disclosed herein; however, is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure or method.

Prior Art:

The method which has been used in the prior art in terms of replacement of ties constitutes a three-pass approach. Firstly, a marking crew or a sighting crew comes along the track and marks particular railroad ties which are to be replaced—typically with a splash of paint or the like. In a second pass, another crew comes along the track behind them and, using the marks that the marking crew has generated, drops the appropriate numbers of ties in position. They are then followed in a third pass by the actual tie replacement equipment which will actually take the new ties which are staged in position along the railroad right-of-way and replacement in the proper places under the rails where the ties are marked for replacement. Subsequently, another crew may follow along directly behind or in a fourth pass and pick up the spent or used railroad ties which are in position by the track on the opposite side of the right-of-way.

The limitation of the prior art which is addressed by the present invention is that the present system and method overcomes the limitations of, for example, a banding-type method for distribution of replacement ties or materials where predetermined set quantities of ties or materials were required to be distributed at the appropriate determined locations.

The collection of the used railroad ties is not directly relevant to the method of the present invention, although the use location data which would be maintained by the system of the present invention could also be used by a following crew picking up the used ties to more quickly speed between locations where ties to be picked up from the right-of-way as well would be found.

GPS:

The system of the present invention 1 in many embodiments is contemplated to use a satellite based global positioning system (GPS) 2 to record or identify the geographical coordinates of certain locations. The GPS 2 includes a satellite constellation 3 comprising a number of individual satellites whose positions are continuously monitored. The satellites transmit signals, including positioning data, which can be received by either fixed position differential GPS stations or by GPS receivers such as a mobile GPS receiver.

It will be understood that the specifics of the GPS receiver used in the method of the present invention will not affect the operation of the present invention and insofar as this is the case it is intended that any and all such variants on a GPS system to be used are contemplated within the scope of the present invention.

It is also contemplated that a different type of a GIS system altogether from GPS could be used to capture or define location data for the replacement of ties or other materials in accordance with the method of the present invention and that the use of any other such GIS type system in place of GPS positioning will also be contemplated within the scope of the present invention.

The other GIS or mapping systems and methods which are contemplated as practicable in terms of locating or identifying certain locations on or in proximity to a portion of railroad include the use of a system which can measure the location in relation to a fixed point on the track itself—for example, a measuring module could be 'zeroed' or calibrated to a certain reference point on the railroad and locations could then be identified by measuring, mechanically or otherwise, the distance of travel of the measuring module along the tracks. For example, one or more reference points could be selected along the relevant portion of railroad track and the coordinates for certain locations could then be captured or expressed in, for example, feet or meters from the reference point, rather than in specific geographically referenced GPS coordinates. It will be understood that the alternate method of measuring and marking locations along a section of railroad track comprising measuring the distance of a particular point or location along the distance and direction of travel on the railroad track from a predetermined reference point, and any and all necessary and attendant modifications to the remainder of the system and method of the present invention, as would be obvious to one skilled in the art, are contemplated within the scope of the present invention.

Yet another method of measurement or location of certain points in relation to the railroad would be to measure the locations in some other way than by the measurement along the track itself from a fixed reference point. For example it is contemplated that another method of identifying certain locations might be to count the number of ties for example, from a calibrated or selected reference point along the railroad track, and the locations could be selected or identified in this fashion. Again it will be understood that the alternate method of measuring and marking locations along a section of railroad track comprising counting the number of ties or another similar repetitive and 'countable' track feature along the distance and direction of travel on the railroad track from a predetermined reference point, and any and all necessary and attendant modifications to the remainder of the system and method of the present invention, as would be obvious to one skilled in the art, are contemplated within the scope of the present invention.

Other methods of determining the location of certain use or drop locations, as will be further described herein, might also be selected by one skilled in the art. Insofar as such other methods of measurement or identification of particular locations on or in proximity to a railroad track result in the ability to capture a set of coordinates or measurements which will allow for the subsequent relocation of a particular spot, any and all such measurement methods and attendant modifications to the method of the present invention are also contemplated within the scope hereof.

Overall, one of the main advantages to the method of the present invention is that one or more operators of location capture devices will be able to work separately, independently and at their own speed both from each other as well as from the actual following distribution or maintenance equipment which is distributing the ties or other materials in question. In a networked implementation of the method of the present invention, it will be understood that, for example, numerous crews in charge of simply identifying ties or materials to be replaced could each have a use location capture module and could go along their way marking use locations and the use location co-ordinates captured by the one or more use location capture modules could then be uploaded to a single central database. From the central database, one or more drop location detection modules or distribution equipment equipped with location marking capabilities as outlined herein could download subsets of information from the central database and follow again along at their own speed performing their respective individual maintenance functions.

Materials to be Distributed in Accordance with the Method of the Present Invention:

As will be outlined in further detail elsewhere herein, the system and method of the present invention is designed to be used to distribute various materials along a section of railroad track, including railroad ties or other replacement materials.

It is particularly contemplated that the method of the present invention will be useful in railroad maintenance applications and specifically in the distribution of replacement railroad ties along the railroad right of way for subsequent installation. However, it is also contemplated that there could be found other similarly useful ways to employ the system and method of the present invention with the attendant modifications primarily to the distribution equipment. For example, ballast might be placed at locations along the right of way for subsequent use, or other types of materials even including rail sections or the like could all be distributed in accordance with the method of the present invention.

Use and Drop Location Overview:

For the sake of illustration of the method of the present invention, it is posited that the method will be used to distribute replacement railroad ties along a section of railroad track for subsequent replacement. As outlined elsewhere herein, railroad tie replacement equipment which is used in such maintenance applications typically does not have storage for large numbers of replacement ties and as such it is typically desired to place the ties to be used in replacement applications along the railroad right of way in advance of the arrival of the track and tie maintenance equipment so as to have all of the necessary quantities of materials in place where and when they are needed.

FIG. 1 demonstrates a section of railroad track in which railroad ties require replacement. This figure is intended to provide the ability to demonstrate both flexibility of the present invention as well as the limitations of the prior art.

For the sake of description herein and throughout, the location of a particular railroad tie to be replaced 28 is a use location 25. At each point that one or more railroad ties is required for use or replacement purposes, that would constitute a use location 25. For example, if five railroad ties are needed to be replaced, there would effectively be five use locations, either in close or not so close proximity depending on how close those ties needing to be replaced were to one another. If the materials being distributed for use were something other than railroad ties it will be understood that the location at which they will be used is still referred to as a use location.

A use location 25 could correspond to a single tie or quantity of material to be distributed, or could alternatively correspond to a multiple quantity of ties or materials. This might depend on the proximity of the places in which the ties or materials need to be used—for example if five ties in row needed to be replaced, a single use location 25 might defined at which a multiple quantity of five ties were to be placed, or alternatively each tie to be replaced could me marked as a single use location in which case five use locations 25 would be defined, at each of which a singular quantity or singular tie was required.

The second piece of location-specific terminology which is required for the description of the method and system of the present invention is the concept of the drop locations 26, which are also shown in FIG. 1. A drop location 26 is a location at which the necessary ties or materials for one or more use locations 25 are to be dropped. Three drop locations 26, more specifically lettered 26A, 26B and 26C, are shown in FIG. 1. The drop locations 26, as will be understood further below, might correspond each directly to a single use location 25. However, as will be understood from the further detail below, a drop location 26 could also correspond to more than one use location 25—where for example six adjacent railroad ties needed to be replaced and had each been marked as single use locations, it would be potentially more convenient, within the reach of the tie replacement equipment itself, to simply drop six replacement ties at a single drop location 26 rather than dropping them at six more specific adjacent drop locations 26, which would in effect be side by side in any event.

There is shown in FIG. 1 a railroad track 27 which is comprised of a pair of rails with a plurality of ties placed in ballast thereunder. As a railroad maintenance task, from time to time certain of the ties need to be replaced. In this particular case, the track demonstrated in FIG. 1 has been marked with a number of ties requiring replacement, using the numeral 28 for ties to be replaced, for the sake of demonstrating the concept of the present invention and the limitations in the prior art.

It can be seen, for example, in the track section 27 that the ties to be replaced 28 are not evenly spaced and, for example, there is at least one section where five or six ties in close proximity all need to be replaced, and other sections, spaced apart by the divisions shown in the track section for demonstrative purposes, where only one tie at a time may need to be replaced. The limitation of the banding method in the prior art described above in the background of the invention was that the railroad ties, even though they could be mapped for distribution to particular locations, needed to be distributed in preset batches such as the number of fifteen or the like, banded together in one large batch. This is not optimal in terms of distributing the right number of ties in a situation either where only a very few ties are required or where a large number that is not a multiple of the number in the batches is required. Referring again to FIG. 1, the use of a batch of ties banded for example in groups of five, would be only partially useful at drop location 26A, since six replacement ties are required at that location. Dropping ties in multiples of five would result in either one too few or four too many ties being at that location if either one or two bundles of five ties each were dropped at location 26A. Conversely and similarly, at location 26B only two replacement ties are required. As such, if a banded group of five ties were dropped there, there would be three too many ties.

The system and method of the present invention is intended to allow for the adaptive selection of drop locations 26 and the appropriate quantity of ties and/or other materials to be dropped at each drop location 26. As is shown in FIG. 1, there are ten ties to be replaced 28. One of these ties corresponds to each of the use locations 25A through 25J respectively.

The next item which is shown in FIG. 1 for reference purposes is the grouping of the ties to be replaced. In this particular case, there are four drop locations 26A through 26D, which are lettered in the figure. Drop location 26A corresponds to six adjacent railroad ties requiring replacement, whereas drop location 26B corresponds to two railroad ties which are close or adjacent to each other requiring replacement, and locations 26C and 26D each correspond to single railroad ties requiring replacement at varying positions along the track section 27.

Use Location Coordinates:

For the operation of the method of the present invention, each use location at which ties or other materials are eventually required for use must be able to be located, either geographically or in relation to the railroad track. The specific location of the use location as would be captured and used by the remainder of the system of the present invention is referred to herein as a set of use location coordinates. The use location coordinates corresponding to a particular use location might, in the case of a GPS enabled system in accordance with the invention, be a set of GPS coordinates at which the capture of a use location was triggered in accordance with the system of the present invention.

In other embodiments of the invention where other types of measurement or location of use locations are used, such as the two methods outlined in summary fashion above where a use location is located by measuring the distance of travel along a particular railroad track from a predetermined reference point, or where a location is determined by for example mechanically counting the number of ties or some other track feature to determine the location of a use location so that the search for that location could later be replicated based on the measurement, which would be captured as a use location coordinate. In either case, any type of a mapping or measurement solution that results in the pinpointing of a use location on or in proximity to the railroad track is contemplated within the scope of the present invention.

Drop Location Coordinates:

Each drop location at which ties or other materials are to be deposited by the distribution equipment must be able to be located, either geographically or in relation to the railroad track. The specific location of the drop location as would be calculated and used by the remainder of the system of the present invention is referred to herein as a set of drop location coordinates. The drop location coordinates corresponding to a particular drop location might, in the case of a GPS enabled system in accordance with the invention, be a set of GPS coordinates.

In other embodiments of the invention where other types of measurement or location of drop locations are used, such as the two methods outlined in summary fashion above where a drop location is located by measuring the distance of travel along a particular railroad track from a predetermined reference point, or where a location is determined by for example mechanically counting the number of ties or some other track feature to determine the location of a drop location so that the search for that location could later be replicated based on the measurement, which would be captured as a drop location coordinate. In either case, any type of a mapping or measurement solution that results in the pinpointing of a drop location on or in proximity to the railroad track is contemplated within the scope of the present invention. Drop locations will typically be calculated rather than captured, in accordance with the present invention, but could also from time to time be marked or captured as well by the use location capture module.

Figure 2:
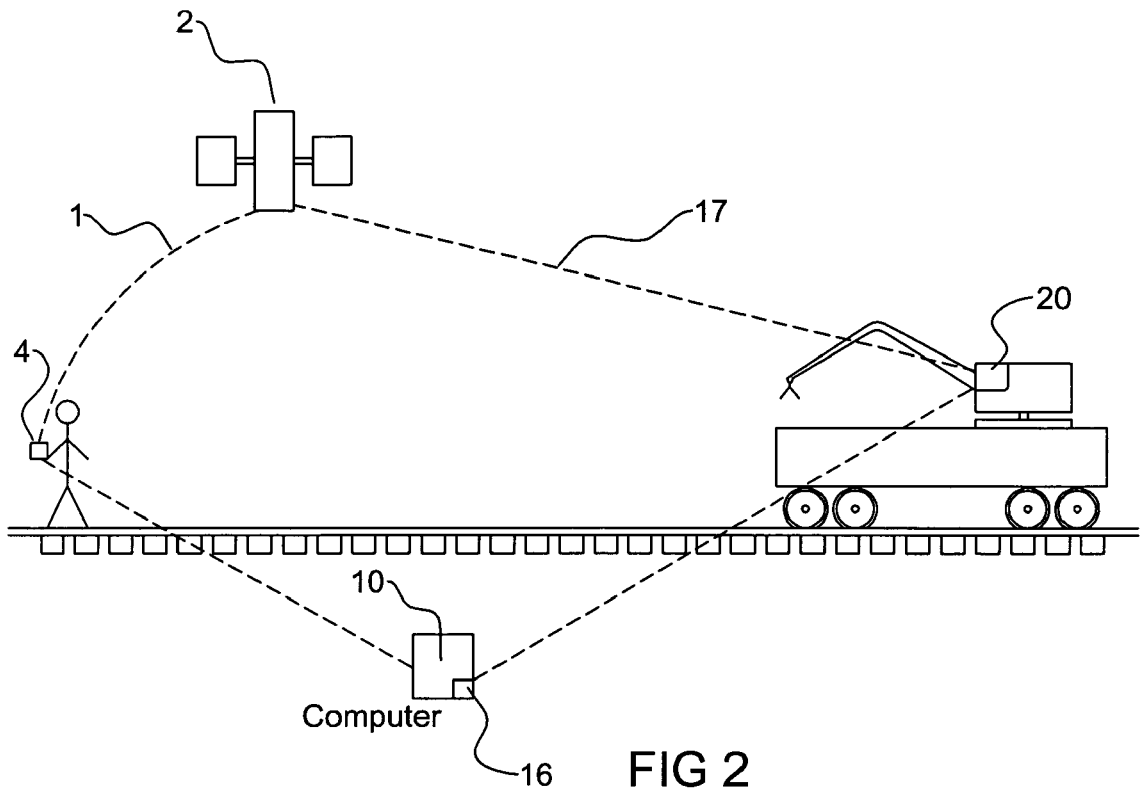
FIG. 2 is a system diagram showing one overall embodiment of the system of the present invention.

Overview of System Components and Operation:

FIG. 2 demonstrates the essential components of the system 1 of the present invention. The system 1 of the present invention is basically a railroad tie distribution system which allows for the adaptive distribution of varying quantities of railroad ties or other materials at varying locations along a railroad right of way for use in subsequent railroad maintenance applications.

A GPS-enabled use location capture module 4 is used to mark or otherwise capture the coordinates of specific railroad ties requiring replacement and to capture the coordinates of these ties requiring replacement on the use location capture module 4. The location of each of these ties or groups of ties needing replacement are use locations, as that term is described elsewhere herein, and the coordinate of each of the use locations are use location coordinates, as described elsewhere herein.

As will be discussed in further detail below, the use location capture module 4 is effectively contemplated to be a portable or handheld size device with a GPS receiver which can, upon pressing a button or some other user intervention, capture a GPS fix, the GPS coordinates captured being the use location coordinates corresponding to a particular use location 25 as outlined in FIG. 1 above. As the use location capture module 4 is used to capture multiple sets of use location coordinates those use location coordinates are cached in the memory of the use location capture module 4 until they can be uploaded to a central location database.

In the embodiment show in FIG. 2, the central location database in which the use location coordinates are uploaded or stored is shown resident on a central computer 10. The central computer 10 which contains a location database 16 is used to store the location data captured by the use location capture module 4 and can also be used to compute or determine the appropriate drop locations for quantities of railroad ties.

Also shown is the tie distribution equipment 17 which will include a drop location detection module 20 (also known as a location marking module) which contains the drop location coordinates and drop location quantities for the dropping of various quantities of railroad ties or materials. As shown the distribution equipment 17 will also be GPS enabled so that the GPS location of the distribution equipment 17 can be related to the various drop location coordinates stored on the drop location detection module 20 and the operator of the equipment 17 can be notified at the appropriate time when a drop location is reached to drop the requisite number of railroad ties on the right of way at that location so they will be closely located to their eventual use locations when the following maintenance equipment shows up.

Figure 2A:
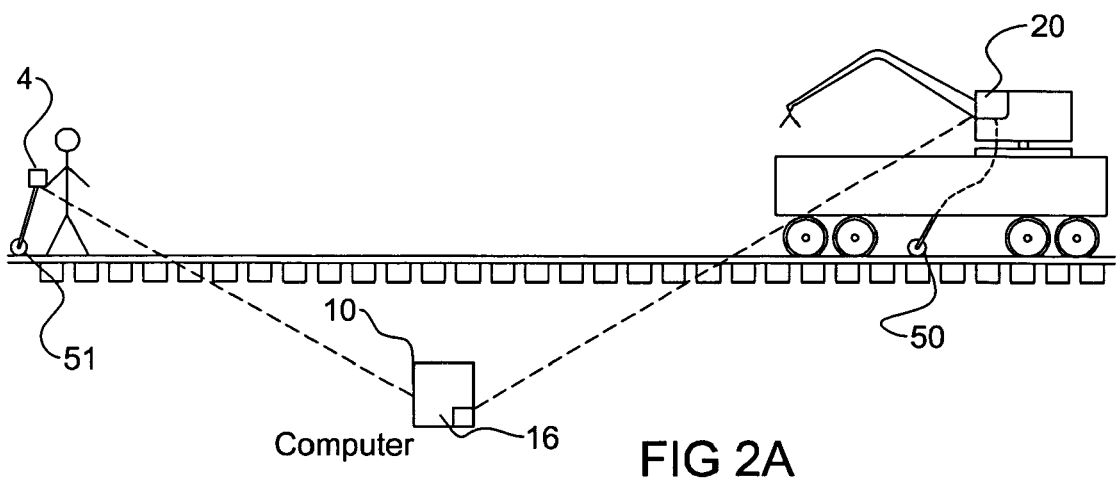

FIG. 2A demonstrates another alternate embodiment of the system of the present invention which shows how a different method of measurement of the location of use locations and drop locations could be accomplished. Rather than a GPS-based system shown in FIG. 2, FIG. 2A shows a use location capture module which has a measurement wheel attached thereto, which as the individual or for that matter equipment to which the locations capture module 4 is attached moves along the track, the measurement wheel can measure the distance travelled by the wheel from some particular fixed point on the railroad. The fixed point on the railroad is now shown here, but could be any sort of a milepost, landmark or otherwise. As the measuring wheel rolls along the track, and it was desired to mark the position of the use location, the measuring wheel distance travelled would be recorded by the remainder of the use location capture module 4. The measuring wheel is shown at 51.

In the embodiment shown in FIG. 2A, again the use location coordinates are uploaded to a central computer 10 with a database 16 therein. Again, as will be outlined elsewhere herein, there are other system typologies which could be contemplated which would eliminate the need for a central computer 10 and rely upon direct communication between the use location capture module 4 and the drop location detection module 20.

Continuing on with FIG. 2A, however, the second portion of the track measurement method which is contemplated is demonstrated where the distribution equipment shown in FIG. 2A, in addition to the drop location detection module 20, includes a measurement wheel 50 attached to the equipment and operatively connected to the drop location detection module 20 such that again the distance along the track from a fixed point can be measured and documented or accessed or used by the drop location detection module 20, and on that basis the use locations previously marked using the use location capture module 4 can be replicated or identified again simply by measuring along the same track the same distance from the same reference point. It will be understood that various changes to some of the remainder of the method of the present invention would be required to practice a measurement method such as this for the capture of use location coordinates, rather than using a GPS receiver and capturing fixed GPS fixes with respect to use locations, but all such necessary changes to implement this would be obvious to one skilled in the art and are contemplated within the scope of the present invention.

Figure 3:
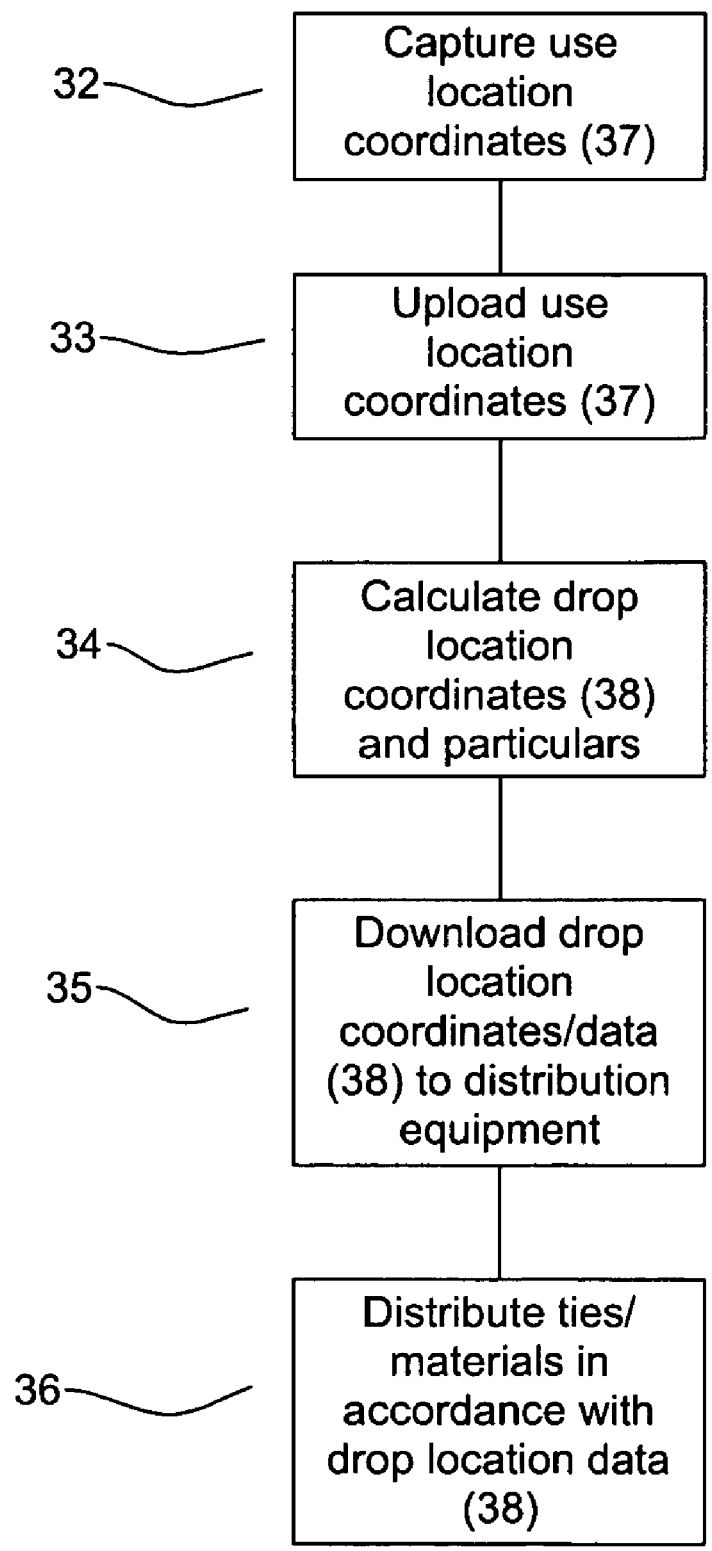
FIG. 3 is a flow diagram demonstrating the general steps of the method of the present invention.

Referring to FIG. 3, there is a shown a flow diagram of the method of the present invention for the adaptive distribution of railroad ties or other materials in railroad maintenance applications. Effectively, the method capturing use location coordinates for uploading to a central storage location and subsequent download to a distribution machine. Drop locations for quantities of ties or materials are determined by the software of the system of the present invention to optimize the placement of various quantities of materials or ties along the railroad right of way. The distribution equipment can then in turn use the drop location data generated to properly distribute the proper quantities of materials.

Reviewing the flow chart of FIG. 3 in further detail, the following can be seen. The first step in the process is to capture the co-ordinates of each use location 25. These are use location coordinates 37. At the most detailed level each tie requiring replacement is a separate use location 25 having its own coordinates 37. Where the coordinates of two adjacent ties to be replaced overlap, then the two use locations 25 might constitute a single use location 25 at which two ties were required to be dropped. This overlap or possibility is also accommodated by the method of the present invention.

As will be outlined further herein, with respect to the equipment and apparatus of the present invention it is contemplated that the capture of the use location data at Step 32 will be done using some type of a use location capture module 4 which includes a GPS receiver 5 which can effectively generate the necessary co-ordinates for each use location 25 for storage in the memory of the use location capture module 4. The use location capture module 4 could be any type of a device with the proper instrumentation to measure or capture the coordinates of a use location upon the triggering of such a capture by the operator.

The interface of the use location capture module 4 might also allow for manual overrides or the like from the operator so that the operator could somehow tag along with the co-ordinates of a particular use location 25 for example that three ties rather than one needed to be dropped at that location. This is a logical extension of the use location data and the method of the present invention and any necessary changes to the method, apparatus or software of the present invention which would be required to accomplish this will be understood by one skilled in the art to be contemplated within the scope hereof.

One of the other limitations of the prior art, even where GPS has been used in the past to effectively tag the drop zones for banded quantities of railroad ties is that the equipment used to do the tagging has also been required to be physically present at the dropping of the material. Basically, a data capture module is used in those prior art methods which can tag in its own memory a particular set of GPS co-ordinates, but it was then necessary for that device to be physically present on the distribution train, for example, and it would effectively beep back or otherwise notify the operator when it reached again in its display mode the same co-ordinates that had previously been tagged in its memory. One of the limitations to this, of course, is that the marking crew or the data capture or acquisition crew who are marking the drop locations for their predetermined numbers of ties is required to only work as fast as the speed of the actual distribution train following along behind. This is a significant time and cost problem since the data capture crew may, in all likelihood, be able to work fairly quickly and may be able to effectively travel over an entire railroad and accomplish their data capture function or tie marking function in the same amount of time which is taken by the tie replacement crew or the distribution crew to do a much lesser number of miles or kilometres of the overall maintenance requirement. This is another issue which is intended to be addressed by the system of the present invention.

Referring to FIG. 3 the second stage which is shown in that flow chart after the capture of the use location data, including the use location co-ordinates 37 for each location at which ties are required to be used shown at Step 32 again in FIG. 3, is to upload that use location data 37 from the use location capture module 4 to a central computer 10 for storage in a location database 16. It will be understood that any number of different methods of communication between the use location capture module 4 and the central computer 10 which would result in the uploading of use location co-ordinates 37 and any other related data from the use location capture module 4 to the location database 16 stored within the central computer 10 will be contemplated within the scope of the present invention.

It is also contemplated that in certain embodiments of the system of the present invention the necessity for a central computer might be eliminated by having the use location capture module 4 and the drop location detection module, to be discussed forthwith, communicate directly with each other. The central location database of use location coordinates could for example be stored in the use location capture module 4 and be accessed directly by the drop location detection module when the download of certain subsets of use location data were required. Alternately or conversely, the central location database could be stored on the drop location detection module and the use location coordinates captured by the location capture device 4 could be uploaded for storage to the central location database on the drop location detection module on either an offline or real-time basis. In either such circumstance, the software for the generation of drop locations and drop location coordinates could be resident upon either the use location capture module 4 or the drop location detection module, rather than on the central computer, and all such configuration and communication changes as would be necessary to implement this change in the system of the present invention are contemplated within the scope hereof.

The next step in the process which is shown at Step 34 is the computation of the drop locations 26 based upon the use location co-ordinates 37 for each of the use locations 25. This could either be done in the central computer 10, or could also be done in the use location capture module 4 in advance of uploading the information or alternatively could also be done by the drop location detection module 20 on distribution of the ties. In any event, as is shown at Step 34 in FIG. 3, the appropriate location of the drop locations 26 is computed. It will be understood that the necessary geographical information both with respect to the individual use location co-ordinates 37 acquired by the use location capture module 4 as well as any other background geographical information such as track layout or other general GPS or mapping information which might be required would also be contained within the location database 16 or elsewhere such that the appropriate calculations could be made to determine the appropriate drop location co-ordinates 38 for individual drop locations 26.

The key to the method of the present invention is that the numbers of ties or materials to be dropped at a particular drop location, as well as the spacing or location of the drop locations themselves, is flexible so that the materials to be distributed can be placed in optimal positions along the railroad right of way for their subsequent use. Depending even upon the type of materials being distributed it may be the case that there were different preferences or rules applicable to the distribution of such materials, and that the incorporation of these local preferences or rules into the software determining the appropriate drop locations would also be contemplated within the scope of the present invention and would certainly enhance the accuracy and utility of the system to the end user.

In the simplest embodiment of the location marking method of the present invention, each use location 25 would correspond to a drop location 26, so that effectively each set of use location co-ordinates 37 would be rendered into a corresponding set of drop location co-ordinates 38 for download and use by the drop location detection module 20 in due course alongside the remainder of the distribution equipment 17. Effectively, a single tie location would be a single drop location, and ties would be dropped individually at each required location.

In a more elaborate calculation methodology, however, the central computer 10 and its attendant software components could use the use location co-ordinates 37 stored in the location database 16 along with whatever remaining information or formulas were required to identify optimal drop locations 26 based upon the proximity of different sets of use location co-ordinates 37. For example, referring to the sample section of track in FIG. 1, the computer could calculate that of the railroad ties to be replaced, the first six lettered 25A through 25F were located in such close proximity to each other based on the individual use location co-ordinates 37, that a single drop location 26 could be used and, as such, the drop location co-ordinates 38 for that drop location could be calculated to be in proximity to all six of those ties and the drop location co-ordinates 38 would then simply also include the additional data for the distribution team that six ties rather than one were to be dropped at that particular drop location 26A.

Once the drop locations 26 had been computed by the central computer 10, either in the more elaborate method outlined above or alternatively even by simply transposing the use location data 37 where ties were to be distributed at drop locations on a one-to-one basis with use locations 25, that information would be stored in the location database 16 until required by the distribution equipment 17 at which point it could be downloaded. The downloading of drop location data or co-ordinates 38 to the distribution equipment 17 is shown at Step 35 in the flow chart of FIG. 3. Again, as was the case with the use location capture module 4 and its upload capability to the central computer 10, it is similarly contemplated that the drop location detection module 20 or related electronic equipment used in association with the distribution equipment 17 could similarly download drop location co-ordinates and data 38 from the location database 16 in the central computer 10 via some type of an interface, whether that be by telephone, hardwire, internet or the like. All such methods of communication are contemplated within the scope of the present invention. It could even by the case that the distribution equipment 17 and the drop location detection module 20 contained some type of a cellular telephone or some other type of wireless capability so that on an ongoing basis the distribution equipment 17 could remain in contact or communication with the location database 16 on a more up to date basis.

With the drop location co-ordinates 38 downloaded to the drop location detection module 20 the only task remaining, as shown at Step 36 in the flow chart of FIG. 3, is the actual distribution of replacement ties or materials. Effectively, the drop location detection module 20 is contemplated to include a GPS receiver 21 which would allow the operator of the distribution equipment 17 to know when a particular set of drop location co-ordinates 38 were reached which corresponded to a drop location 26 and at which one or more railroad ties or other materials were to be dropped.

It will also be understood that while the method of the present invention is disclosed herein in relation to the use of manual labour or supervision in the distribution of the railroad ties—for example, there still needs to be an operator of the train or of the tie distribution machine 19 to distribute the ties to the railroad right-of-way—it will also be understood that this could be employed in an entirely automated circumstance and any such additional modifications to the method of the present invention are contemplated within the scope hereof.

In any event, to relate the distribution Step 36 again to the fictitious or sample track section shown in FIG. 1, as the distribution equipment 17 moves down the track 27, at each drop location 26A through 26D the appropriate number of ties would be notified to the operator and dropped at that location. This adaptive and flexible method of distribution of railroad ties or other materials is able to enhance the efficiency of the tie distribution process and overcome many limitations both in terms of cost and time effort expended in this process in the prior art.

Figure 4:
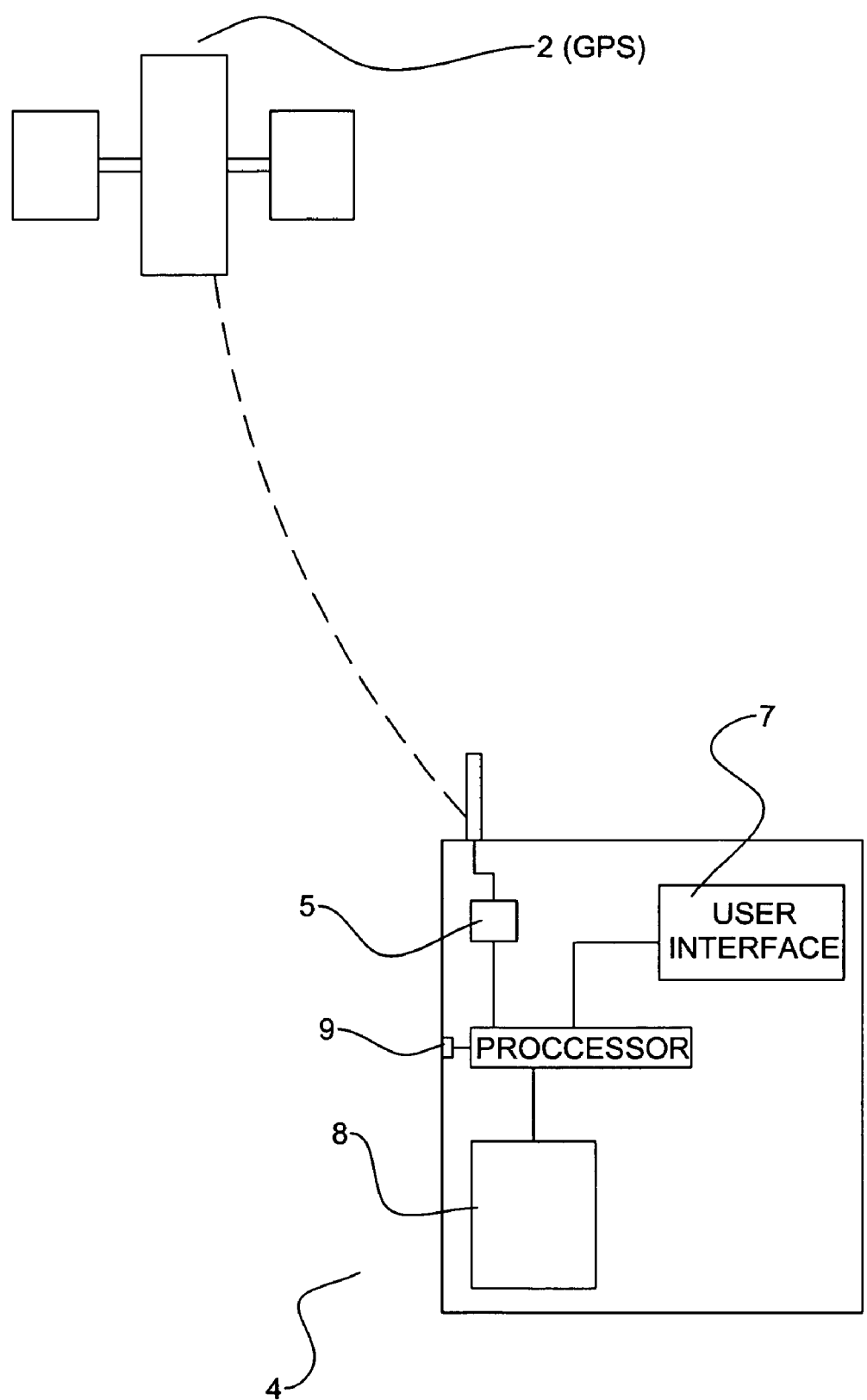
FIG. 4 is a block diagram of one embodiment of a data capture module of the system of the present invention.

Identifying Use Locations:

FIG. 4 shows one embodiment of the use location capture module 4 of the present system and method. The essential components of a use location capture module 4 are a GPS receiver 5 which is capable of receiving GPS co-ordinate information from the GPS system 2. Another component of the use location capture module 4, in addition to the GPS receiver 5, is a memory 8 which is capable of storing particular use location co-ordinates 37. Beyond the memory 8 and the GPS receiver 5, there is an upload interface 9 from which the use location capture module 4 can upload use location co-ordinates 37 from the memory 8 to the central computer 10. As is discussed in more detail herein, the central computer 10 can be equipped to communicate with the use location capture module 4 in any type of physical fashions or using a number of different protocols, and any method which accomplishes the objective of transferring the use location co-ordinates 37 from the memory 8 of the use location capture module 4 to the central computer 10 is contemplated within the scope of the present invention.

The use location capture module 4 also has a user interface 7 of some type, which would be used by an operator of the device 4 to instigate the capture of a particular set of use location co-ordinates 37. The user interface 7 of the use location capture module 4 might be something as simple as a button on the face of the device which, when pressed by the operator, would cache the GPS co-ordinates at that present time as a set of use location co-ordinates 37. The interface 7 might be more elaborate than this as well, allowing for example the operator to manually override or increase the number of ties to be provided at a particular use location 25 or the interface 7 could also allow for additional information to be stored by the user or displayed to the user, for example information as to track condition or other types of information which could be used in other applications to either view or assess track condition information or to distribute other types of materials. While the use location co-ordinates 37 for the sake of tie distribution will basically consist of a set of GPS co-ordinates, on the assumption that each time a co-ordinate is stored it corresponds to a single tie needing to be replaced, it will be understood that other extensions of the equipment could be conceived which would or would not be directly relevant to the method of the present invention, but could in any event enhance the overall functionality of the maintenance function again and might be desirable by railroads on this basis.

The use location capture module 4 could be directly integrated into some type of a tie marking module or vehicle. As has been indicated herein, typically what has been done in the past is the ties that are to be replaced 28 are marked in some visual fashion, typically with a splash of paint or the like, for the tie replacement equipment to follow on to know which ties to replace. It might be the case that a simple machine could be developed which would, at the same time as applying this marking to the tie, capture the use location co-ordinates 37 corresponding thereto.

Any embodiment of a use location capture module 4 which accomplishes the goal of capturing and caching the GPS coordinates of use locations for use in the method of the present invention will, it is understood, be within the scope of the claimed invention.

If a method other than GPS marking was used to locate use locations, such as the methods of measurement of locations along the track outlined herein, the necessary changes could be made to the general type of use location capture module 4 outlined herein to accommodate any such different measuring or capture method and all such changes are contemplated within the scope of the present invention. For example another method of marking use locations as has been described herein would be to effectively measure the distance of particular use locations along the track from a fixed or predetermined base point or 'zero point'—for example, a particular crossing or marking on a train track could be chosen as the fixed base point, and the use location capture module 4 could then be attached to a measuring device which would travel along the train track as the user or operator of the module 4 moved along the tracks (perhaps on a track speeder or the like)—it is contemplated that such a mechanical or electronic sensor or measurement device could then provide to the remainder of the use location capture module 4 the accurate measurement of distance from the fixed base point to a particular use location along the train track. To later find the same location, a drop location detection module and distribution equipment could travel along the same track and measure the same distance from the fixed base point to locate the use location or locations in question. It will be understood that any necessary modifications to the system or method of the present invention to accommodate this means of selecting or measuring use locations by measuring the distance to a use location along the track from a fixed base point is specifically contemplated within the scope of the present invention.

In such an embodiment, the measurement of distance along the track from the fixed base point to the use location would constitute the use location coordinates in respect of that particular use location.

It is also contemplated that the use location capture module 4 might allow for the user to manually designate a particular drop location—while it is contemplated that the method of the present invention would typically include the step of optimally selecting the drop locations on an automated basis based on the use locations and other rules or formulae within the system of the present invention, the use location capture module 4 could allow for the designation of a specific drop location. In an embodiment of the present invention it is specifically contemplated that such a use location capture module might be a PDA or other portable electronic device with a more intricate user interface, in which case the software in that device could allow for the designation of a particular drop location or locations by the user, and the system could automatically match up a selection of use locations to this predetermined or specified drop location, or the interface of the use location capture module 4 could also provide for the ability to have the user match up a specifically marked drop location to one or more specific use locations. Where a PDA or the like was used for a use location capture module 4, the PDA or other unit would simply need to have a GPS receiver attached thereto or be otherwise instrumented to allow for the measurement or location of use locations and the capture of the coordinates of such locations as outlined otherwise herein.

Figure 5:
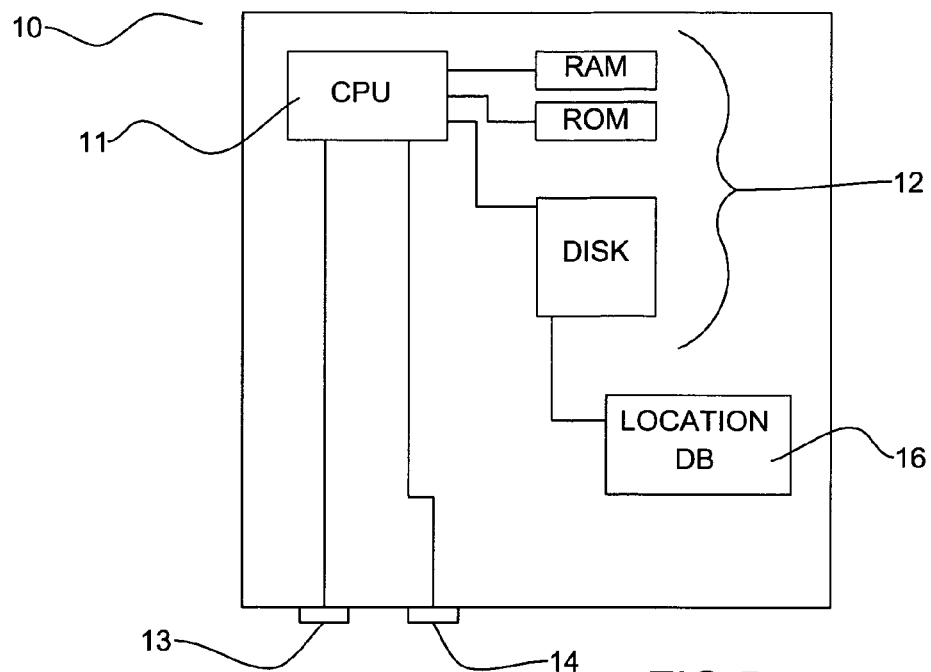
FIG. 5 is a block diagram of one embodiment of a central computer of the system of the present invention.

Central Computer:

FIG. 5 is a block diagram of one preferred embodiment of the central computer 10 of the present invention. The central computer 10 includes a CPU 11 and a memory system 12. The use of a CPU 11 in conjunction with ROM, RAM, disk-based storage devices and the like and a clock circuit is well know to those skilled in the art of CPU-based electronic circuit design. The central computer 10 as referred to herein means the combination of memory and storage devices used to retain data within the computer 10.

The central computer 10 also includes one or more communication ports, two being shown here at 13 and 14, which are used to communicate with devices outside of the computer 10. Specifically, a location capture upload interface or port 13 could be used to communicate with one or more use location capture modules 4 in order to upload use location co-ordinates 37 from the use location capture modules 4 to the location database 16 hosted by the central computer 10 in its memory 12. Secondly and similarly, a distribution download interface 14 can be used to communicate with one or more drop location detection modules 20 on various tie distribution equipment 17 to download from the central computer 10 and the location database 16 hosted therein the necessary drop location co-ordinates 38 to instruct the distribution equipment 17 properly in location of drop locations 26 for the distribution of railroad ties or other materials in accordance with the present invention.

It will be understood that the use location capture module 4 and the drop location detection module 20 might also be equipped with the same protocol such that a single communications port rather than the two ports 13 and 14 which are shown could also be used. In particular, the ports 13 and 14 might be modems, network connections or some other method or apparatus allowing for the transmission and receipt of data by the computer 10 with or from an external device.

As indicated, the central computer 10 hosts a location database 16, and in addition it would also potentially include processor instructions 15 which can be read and executed by the CPU 11 where necessary to complete the storage of use location co-ordinates 37 received from a use location capture module 4 or to otherwise compute the location of drop locations 26 and/or communicate drop location co-ordinates 38 which have been computed and/or stored in the location database 16 to the drop location detection module 20 on one or more sets of distribution equipment 17.

The central computer 10 would have, in addition to the data stored in the location database 16, which would be the use location co-ordinates 37 and drop location co-ordinates 38, the necessary software components or processor instructions to allow for the proper computation or location of drop locations 26 and drop location co-ordinates 38 upon receipt of use location co-ordinates 37 from one or more use location capture modules 4.

It will also be understood that the central computer 10 could be removed from the method or system of the present invention without departing from the scope or intention hereof. The benefit of having a separate central computer 10 containing the location database 16 is that for example more than one use location capture module 4 and more than one distribution system 17 could be used on a network-wide basis by a railroad. For example, there could be more than one data capture team out marking the use locations 25 with more than one use location capture module 4, and there could be more than one set of distribution equipment 17 working on the railroad, and each of those sets of distribution equipment 17 could download the necessary size of batches of work to do at one time, and on this basis the use of a central computer 10 to host a location database 16 can be seen to be desirable. However, it could be the case that the use location capture module 4 actually had the necessary software and hardware capabilities therein to, on its own, calculate the appropriate drop location co-ordinates 38 and/ or could either store the location database 16 itself until it was accessed directly by the drop location detection module(s) 20 to download information, or alternatively and conversely the use location capture module 4 could communicate directly with the drop location detection module 20 and upload the use location co-ordinates 37 from the memory 8 of the use location capture module 4 to a location database 16 hosted directly by the drop location detection module 20 in the place of the central computer 10.

It will be understood that the direct interface of the use location capture module 4 with the distribution equipment 17 and its necessary marking module 20 is contemplated within the scope of the present invention, as is the addition of the central computer 10 to the present invention for the purposes of centrally maintaining all of the necessary information so that multiple units of either the acquisition type or distribution type could be used in varying locations or at varying speeds.

Location database:

The location database 16 would be used to record the use location co-ordinates 37 of various use locations 25 identified by the user of one or more use location capture modules 4 interfaced with a central computer 10. As well as storing the use location co-ordinates 37, which might include not only GPS co-ordinates but also quantities of materials required at a particular use location 25 or other non-related information, the location database 16 would also hold in a separate table or elsewhere in its data structure the calculated drop location co-ordinates 38 for each drop location 26 at which materials were to be distributed. The drop location co-ordinates 38 could be calculated or prepared by a software component resident in the central computer 10 upon receipt of use location co-ordinates 37 from a use location capture module 4.

Storage of the use location data such as the use location co-ordinates 37 or the drop location co-ordinates 38 in the location database 16 for later historical analysis of maintenance requirements, ongoing maintenance tasks or the like is also contemplated herein.

The type of information stored in the location database 16 with respect to use locations 25 or drop locations 26 could again vary in levels of complexity. At its most basic level, where each use location 25 was made to correspond to a single drop location 26, the only information which might be maintained in the location database 16 would be the use location co-ordinates 37, which would be equated in the software to individual drop locations 26 and, as such, the use location co-ordinates 37 would also be used by the distribution equipment as the drop location co-ordinates 38. As indicated, there could be other information stored with respect to each use location 25 or drop location 26 in addition to the GPS co-ordinates of that particular location such as modifications or numbers or quantities of materials required at an individual location or other data checking fields in the data structure or the like.

As has been outlined above, the software components of the central computer 10, or in the case that the use location capture module 4 or the drop location detection module 20 is hosting the location database 16, then the software components resident in and exercising upon those particular machines, would be capable in the more elaborate adaptive method of the present invention of aggregating or calculating the location of the drop locations 26 by aggregating the use locations 25 that were in close or adjacent proximity. The software components that did this could, for example, identify from looking at multiple sets of use location co-ordinates 37 that they were in close enough proximity that it would be more efficient to simply drop all of the ties or materials required at those number of locations at one drop location 26 and, as such, one single set of drop location co-ordinates 38 could be generated, rather than a plurality of drop location co-ordinates, and the drop location co-ordinates or date 38 could simply include the necessary information for the distribution equipment via the marking module 20 to know the particular proper number of ties or materials to drop at that location.

The method of calculation of these drop locations 26 where certain use locations 25 were going to be aggregated for batched or grouped material distribution could be such that as the use locations 25 got further apart the system would automatically know, determine or ascertain based on the proximity of those use location co-ordinates 37, using some type of GIS system or formulas in place therein, that in those cases it was more efficient to drop the ties or materials individually at individual use locations 25 rather than aggregating the material for central distribution at an aggregated drop location 26.

It will be understood that the precise nature or structure of the location database 16 could be any structure that could be properly managed by the central computer 10, use location capture module 4 or drop location detection module 20, wherever the database was resident in the system of the present invention.

It is specifically intended that the software and business methodology outlined herein and the program resulting therefrom, i.e. a program which can based upon a series of map coordinates of use locations for tie replacement, along with the related route information necessary being stored in the system, properly allocate or locate the appropriate drop locations for distribution of varying quantities of railroad ties or other materials is specifically claimed and covered.

Determining Drop Locations:

There are two different extreme material distribution methods which are contemplated to be workable within the scope of the present invention, and the combination of these two methods would also be workable and in fact may be the most desirable.

The system could be used to either drop individual replacement ties or quantities of other materials at or very near to their individual use locations, since the data which can be captured can obviously be stored on an individual railway tie basis. As such that necessary information could be generated by the central computer and with the appropriate modifications to the distribution device itself or the user interface thereof, the tie distribution equipment 17 could simply move along the track and at each individual location where a tie was to be replaced, individual ties could be dropped.

The second method which could also be used or practised using the method and apparatus of the present invention would be to effectively select the appropriate locations at which to drop multiple quantities of railroad ties based on again the individual GPS coordinates of the ties needing to be replaced having been captured and stored in the central computer such that the optimal location for dropping of multiple ties could be selected.

The method of selection of locations for distribution of railroad ties or other materials could also be effectively a combination of the method of dropping single ties where required, and the distribution of larger batches of varying sizes. An adaptive distribution model could be used where any number of required ties as was determined to be most efficiently or effectively placed or located could be used—i.e. single ties could be distributed where optimal, and if there was a crossing or some other location where a larger number was required then the method could create or indicate to the operator a particular distribution location at which to distribute a larger number of ties. It will be understood that this adaptive potential—i.e. the predetermined location of distribution locations for varying numbers of ties—could be changed in non-substantial ways obvious to one skilled in the art, and that all such variations on the method are also contemplated within the scope of the present invention.

The central computer could determine the optimal distribution locations and numbers of ties to be distributed at each location based upon whatever distribution profile were loaded therein, and the distribution locations could then be downloaded into the drop location detection module 20 on the distribution equipment 17 for use in the distribution of ties to the selected distribution locations. Factors ranging from the reach or nature of the specific tie distribution equipment to be used, grade of the track or right of way, speed with which the equipment should reach the replacement ties etc. could all be written into the algorithms used to determine the optimal placement of drop locations.

Computer Software:

One element of the system of the present invention is a computer software component which can be used to select the proper location or sites for drop locations 26 in accordance with the method of the present invention.

It is specifically contemplated with respect to the majority of the embodiments demonstrated in the figures herewith that the central location database 16 would be located on a central server computer 10 which central server computer 10 would be capable of communicating with both the use location capture modules 4 and the drop location detection modules 20 of the broader system of the present invention. Each of those modules would be able to communicate with the central server computer 10 for the sake of either uploading use location coordinates and data to the central location database or alternatively for the sake of downloading drop location coordinates, quantities and other data from the central location database. It will, however, be understood that overall the method of the present invention could also be practised in the absence of the central server computer 10, whereby the central location database could be resident either in the use location capture module 4 or the drop location detection module 20 and the necessary changes to the communication protocols between those two modules directly could be made so as to allow for the seamless operation of the method of the present invention in the absence of the central server computer.

In any event, it is contemplated that the location selector software component 52 of the system of the present invention will be a software component which, as demonstrated, would be resident upon the central server computer 10. The location selector software component 52 would choose the location or sites for drop locations 26 along the portion of railroad in question based upon the use location coordinates 37 stored within the central location database. Effectively, the location selector software component 52 would access the central location database X and, based upon the use location coordinates 37 stored therein, as well as the remainder of a profile saved within the memory of that software component or elsewhere in the central server computer, would select the proper locations alongside or in proximity to the railroad, being drop locations 26 at which materials should be deposited. A drop location would be selected in respect of each use location which was stored within the database. It may, as outlined elsewhere herein, be the case that each single use location was made to correspond to a separate and single drop location, or alternatively depending upon the settings in the profile on the central server computer and the proximity of the use location coordinates in respect of each use location to each other, the location selector software component 52 might also in certain cases choose to site one drop location 26 which would correspond to multiple use locations 25 and at which drop location 26 then a multiple quantity of materials such as railroad ties or the like would be dropped.

The location selector software component 52 could be resident on the same processor or computer unit as the central location database 16. For example, the central server computer 10 in the embodiments shown might not only be a host to the central location database 16, but also host or store and execute the location selector software processor instructions 15 as well. It will also be understood, however, that the location selector software component and processor instructions could be resident upon either the use location capture module 4 or the drop location detection module 20 and that the calculation or determination of appropriate drop locations 26 could be conducted by either of those modules at their appropriate point of engagement in the method of the present invention. For example, if the location selector software component 52 were resident upon the use location capture module 4, the use location capture module 4 upon execution of these location selection processor instructions 15 and the attendant profile data used therewith, could determine the proper locations for drop locations 26 in advance of storing all of the use location data as well as the drop location data to the central location database. In fact, in a situation where the use location capture module 4 was determining the location of drop locations 26, it may not even be necessary for the central location database 16 to retain the use location data, since the only information which might in a very basic embodiment be important to the materials distribution equipment 17 would be the location of the drop locations 26 and presumably the work crew which came along after the fact would know where the use locations 25 were that corresponded to each drop location. It is contemplated that this could simply be an optional approach, however, and by and large both the use location data 37 as well as the drop location data 38 would likely be retained in the central location database 16, both for operational as well as historical purposes.

The location selection software component 52 could be located on the use location capture module 4, but could also alternatively be resident upon and executed by the drop location detection module 20. If the location selection software component 52 were resident on the drop location detection module 20, the central location database 16 might also be located on the drop location detection module 20 or could still also be stored on a central server 10 or on the use location capture module 4. Again, it will be understood that so long as the location selection software component 52 were capable, through the particular module or computer on which it was resident, of accessing the central location database 16 on the module or computer on which it were resident, that the method of the present invention could be practised.

The location selection software component 52 of the present invention could have a fixed profile built into it which would basically consist of a fixed number of formulas or algorithms which could be applied to the various use location coordinates 37 and data contained within the central location database 16 for the purpose of determining the proper locations for drop locations 26 and subsequently generating the drop location coordinates 38 and drop location quantities for use in the depositing of materials at those drop locations 26. It might also be the case, however, that the profile itself which determined the location of the sites would be customizable, either automatically or manually. For example, it might be the case that if the location selection software component 52 detected or determined that the use location coordinates 37 related to use locations that were on average further apart rather than closer together, the weighting of the formulas in the equation which determined the location of drop locations 26 could be adjusted. It will be understood that this is only one type of an obvious modification to a static calculation or model for the location of drop locations 26 in accordance with the method of the present invention and any such similar formula adjustments or the like which would accomplish the result of adjusting the basis on which the location selection software component 52 of the present invention would determine the location of drop locations 26 and their attendant drop location coordinates 38 and drop location quantities are contemplated within the scope of the present invention.

Figure 6:
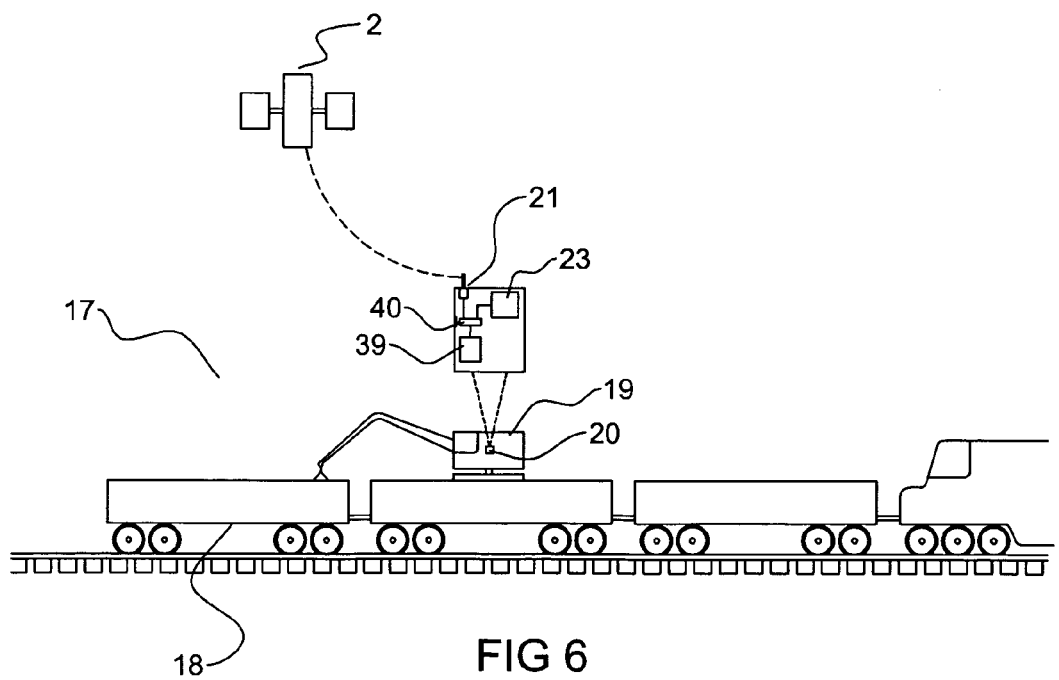
FIG. 6 is a block diagram of one embodiment of the distribution equipment of the system of the present invention.
Figure 7:
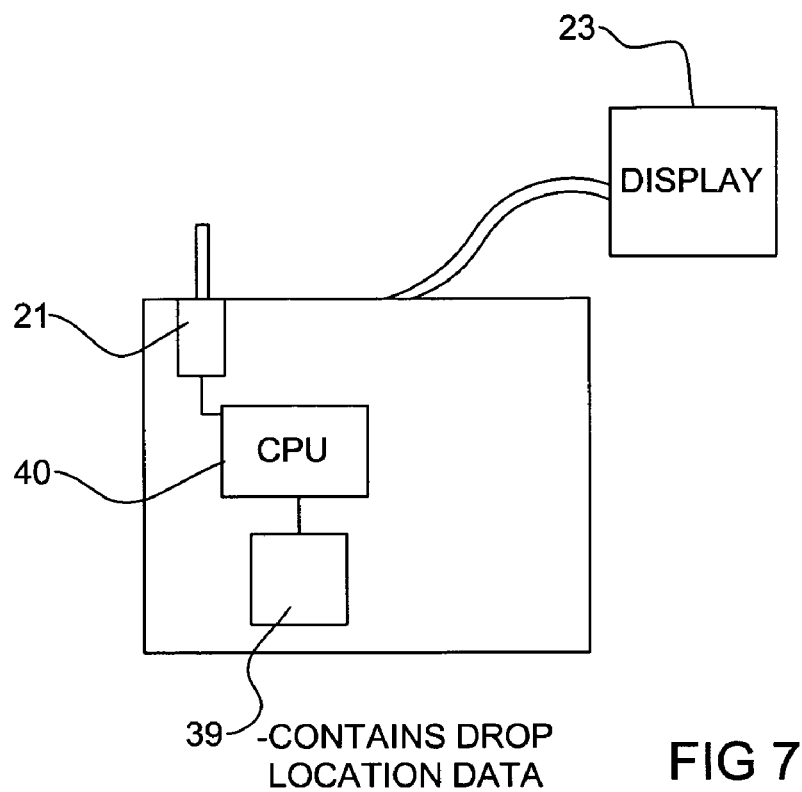
FIG. 7 is a block diagram of one embodiment of the location distribution monitoring hardware on the distribution equipment of the system of the present invention.

Distribution Equipment:

The next element of the system of the present invention is the actual supply distribution equipment 17. Normally what the distribution equipment 17 will comprise is a train used to carry and subsequently drop or distribute railway ties or other materials to their appropriate locations along the railroad right-of-way. This distribution equipment 17 which is shown in FIG. 6 consists of a work train containing one or more gondola or other railcars 18 for the carriage of replacement railway ties. Effectively, either a road rail power unit or a locomotive could be used to push or pull one or more such tie transport cars 18 along the railway and the ties could then be removed from these cars as needed and dropped at their required drop locations 26.

In this particular case what is shown is a tie distribution machine 19 which is capable of effectively crawling along the top of a train and removing materials from the cars for placement along the trackside. Alternatively, this equipment could also be used for other railroad maintenance applications, but in this particular case it is contemplated that this type of car top crawling device would be of utility in the distribution of railroad ties or similar maintenance materials such as this. There are various other types of equipment which could be used to haul or drop ties at their required locations and all such prior art equipment or machinery is contemplated within the scope of that element of the present invention.

Drop Location Detection Module:

While the use location capture module 4 is responsible for the acquisition of the use location co-ordinates 37, it is the drop location detection module 20 which, when used in association with the tie distribution machine 19, is responsible for the indication to the operator and/or for the distribution of the railway ties or other materials at their appropriate drop locations 26.

The drop location detection module 20 and its related user interface or information display would be located in the cab or at the controls of the distribution machine 19. As is discussed further herein, the drop location detection module 20 is effectively a device which can either be built into new equipment or retrofitted to existing equipment that comprises a GPS receiver 21, a memory 39, a download interface 40, and some type of an operator display or interface 23. In circumstances where the locations of use locations have been captured in a non-GPS method—i.e. such as measurement along the track as outlined elsewhere herein—the drop location detection module 20 could have the necessary instrumentation or sensor to make these types of measurements and that equipment and its appropriate interface to the remainder of the module 20 could take the place of the GPS receiver 21.

The drop location detection module 20 via the download interface 40 will acquire from the central computer 10 and the location database 16 stored therein the drop location co-ordinates 38 and related data and information which are required to properly distribute the railroad ties or other materials contemplated or calculated by the location database 16. The module 20 can basically download the necessary drop location co-ordinates 38 for a particular section of track on which the distribution equipment 17 are currently working and, in this fashion, more than one set of distribution equipment 17 can be used with one central computer 10 and database 16.

In any event, a quantity of drop location co-ordinate data 38 will be downloaded from the location database 16 into the memory 39 of the marking module 20. The circuitry of the marking module 20 would then basically monitor the current location of the distribution machine 19 in relation to the sets of drop location co-ordinates 38 stored within the memory 23. As a particular drop location 26 is reached, the display or user interface 23 will alert the operator of the tie distribution machine or picker arm 19 to the fact that they are located at a drop location 26 and that one or more ties or quantities of material need to be dropped at that location. Once the requisite quantity of material is dropped at that drop location 26, that particular set of drop location co-ordinates 36 would be dropped from the memory of the module 20 or otherwise skipped such that the next approaching set of drop location co-ordinates 38 would be monitored for their proximity to the machine 19 and again the operator could be advised when that next location 26 were reached and the next quantity of material could be dropped.

As outlined above, there is a circumstance contemplated in which the drop location detection module 20 may actually host the location database 16, in an embodiment of the system of the present invention where the central computer 10 is removed. In that case, the additional circuitry and storage involved in storing and maintaining the location database 16 would be added to the construction of the drop location detection module 20 and such changes or modifications will be obvious to one skilled in the art and are also contemplated within the scope of the present invention.

The user interface 23 of the drop location detection module 20 might be as simple as an indicator light which would illuminate or otherwise notify the operator each time a single tie needed to be distributed. This would lend itself best to the circumstance or situation outlined herein in which each use location 25 and its attendant set of co-ordinates 37 corresponds to a separate and singly calculated or located drop location 26 with its corresponding co-ordinates 38. An indicator light which would illuminate when individual ties were to be dropped would be a very simple user interface which could be enhanced for added functionality, but demonstrates the basic utility and simplicity of the method and model of the present invention. A single indicator light could also be used in a method where more than one tie was to be dropped at individual drop locations 26, since basically what could happen would be the light could remain illuminated until the proper number of ties had been dropped. (This would require the automatic counting or keying into the module 20 somehow of the count of the number of ties dropped—a load cell on the picker arm or distribution arm might be incorporated for this purpose).

One aspect of the actual tie distribution machine 19 of the present invention which is contemplated, particularly in the case of the train top distributors 19 as shown which use a picker arm of some kind or another to distribute individual or more than one tie at a time, would be to incorporate a load cell into that picker arm which would effectively allow the distribution equipment 17 and specifically the tie distribution machine or arm 19 to count the number of ties which were distributed or taken off the train in a particular arm motion and it could then basically count or compare this number of ties against the number of ties required to be distributed at an individual location. This would be of particular benefit in situations where potentially more than one tie was to be distributed at an individual location. The use of a load cell on a picker arm or the use of any other type of method of counting the number of ties distributed at a particular drop location 26 for the purpose of comparing that against the calculated number of required ties is contemplated within the scope of the present invention as well.

Figure 8A:
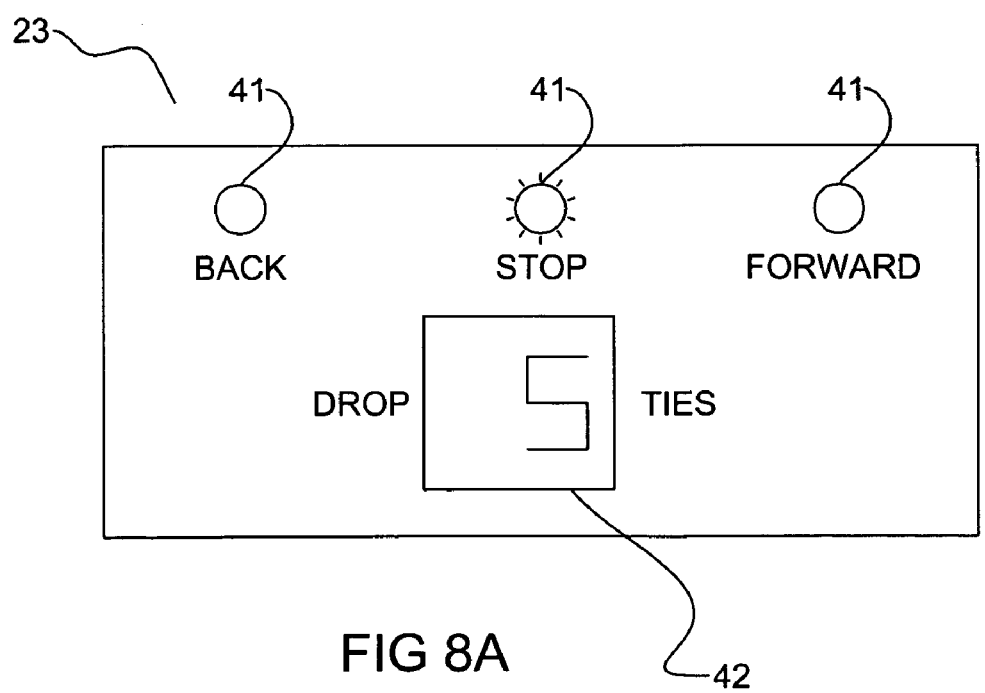
FIGS. 8A and 8B show two sample embodiments of an operator interface of the drop location detection module of one embodiment of the system of the present invention.
Figure 8B:
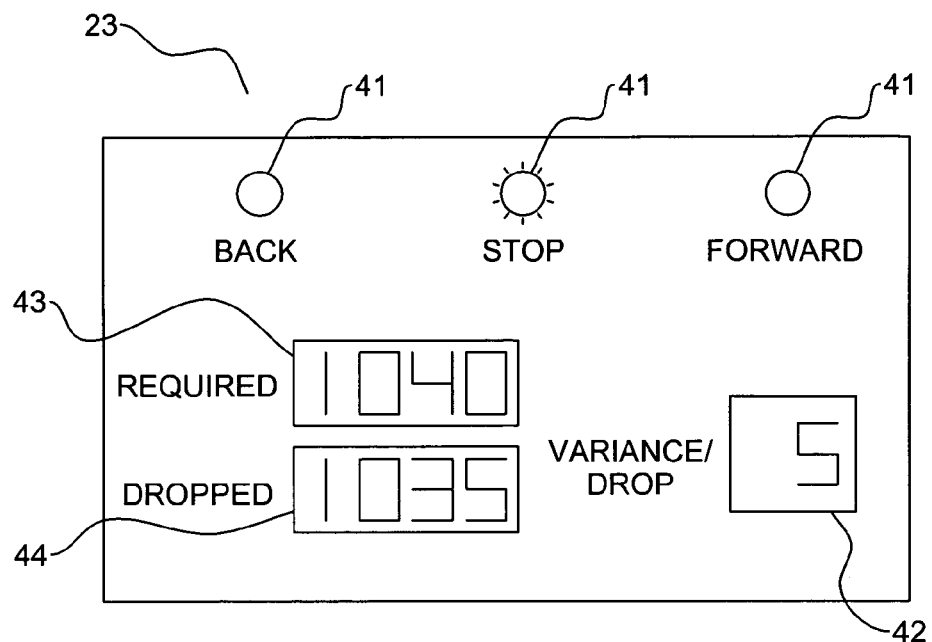

Beyond the basic single indicator light user interface 23 outlined so far, FIGS. 8A and 8B show two other alternate types of user interface 23 which could potentially work with the marking module 20 on the tie distribution machine 19. FIGS. 8A and 8B show only two particular types of a user interface which it is contemplated can be used with a drop location detection module 20 of the present invention. It will be understood that other types of interfaces could also be conceived without departing from the intended scope of the invention as claimed and outlined herein.

FIG. 8A shows one type of a user interface which it is contemplated could be effectively mounted in the cab of a picker arm or tie distribution machine 19. There is shown basically a set of three indicator lights 41 which are marked "forward", "stop" and "backward". It is contemplated on the basis of the proximity of the module 20 and its associated GPS receiver 21 to the next drop location 26, the circuitry of the user interface box 23 could basically indicate to the operator whether or not the next drop location 26 was forward or back from the present location and, by illuminating one of those two lights, could direct the operator of the machine in terms of moving forwards or back to the next location. The "stop" indicator light could for example tell the person that they are at the location and that would be the location to stop and drop the next quantity of ties or materials.

The next item which is also shown on the interface box 23 in FIG. 8A, in addition to the indicator lights 41, is a digital counter 42 which could effectively display from the memory 39 of the device the number of ties or quantity of materials to be distributed at that particular location. For example, if that particular drop location 26 required the dropping of five ties, the number "5" could be displayed by a digital counter in this fashion. That is what is shown here with the digital counter being at "5" and then, in conjunction with a load cell or in some other fashion, that counter could be reduced with each tie or quantity of material that was dropped at the drop location 26 until it came down to zero, at which point one of the indicator lights 41 for forward or backward could come on and the machine could move on to the next drop location 26. It will be understood that this is just one very simple embodiment of a user interface 23 which could be used with the drop location detection module 20 in accordance with the present invention to help the operator of the distribution equipment 17 to properly locate and distribute the railroad ties or other materials at their appropriate drop locations 26.

FIG. 8B shows a somewhat more elaborate user interface box 23 which again could be integral with or a part of or connected to the drop location detection module 20 of the present invention. In the interface of FIG. 8B there is again shown a set of indicator lights 41 for the directions of forward and reverse as well as a stop indicator light. Again there is also shown a digital counter 42 which could indicate the quantity of ties or materials to be dropped at a particular drop location 26 when it was reached.

Also present in the interface of FIG. 8B however are two cumulative counters, one of which 43 shows a cumulative total of the number of ties or quantity of materials that, based on a count of the information or data stored in the memory that the distribution equipment 17 should have dropped to that point, and the second counter 44 shows the actual count of the number of ties or quantity of materials that have been dropped. Basically, the goal of the operator of the equipment 17 would be to keep the values of these two counters 43 and 44 as close as possible. The digital counter 42 could in one embodiment, in addition to showing the number of ties that needed to be dropped to make the counters equal, also show a negative number if, in some circumstance, more ties had been dropped than should have been, and this would again allow the operator to keep the numbers as close as possible and to be aware of the overage at any point in time.

These interfaces shown in the modules of FIGS. 8A and 8B are not in any way intended to be at all demonstrative of the total scope of different interfaces which could be contemplated within the scope of the present invention. In the case of a drop location detection module 20 or location marking functionality being built in to a new piece of equipment, it is even foreseeable that the user interface 23 could be a part of the dashboard or cab electronics or in some other fashion integrated into the machine and that any type of an indicator or user interface which generates an indication of the location at which a tie or some material is to be dropped will be within the scope of the present invention as it is intended to be claimed.

As indicated in further detail above, it is contemplated that the tie distribution machine 19 itself could include a load cell of some type of a counting mechanism by which the distribution quantities which had to that point been distributed could be counted and properly tracked by the system. It will be understood that the use of such a load cell or some type of counting mechanism could obviously be integrated with the user interface 23 of whatever type of a primary drop location detection module 20 were used in the machinery.

Integrated Equipment Operation Using Multiple Drop Location Detection Modules:

It is also contemplated that the use of a secondary drop location detection module 46 in accordance with the general principles of the present invention could further enhance the operation of the distribution equipment 17.

Figure 9:
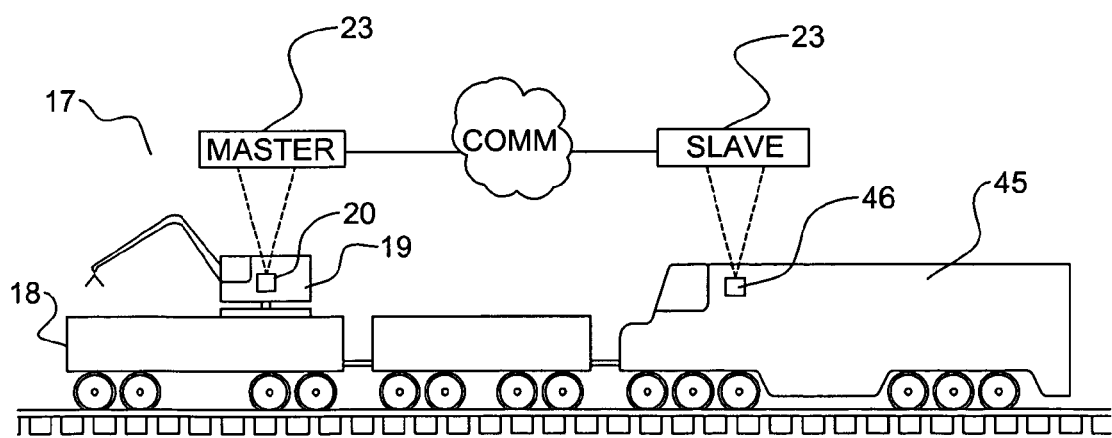
FIG. 9 is a system diagram showing one embodiment of the system of the present invention demonstrating the integrated control of distribution equipment using a plurality of drop location detection modules.

As outlined above, the distribution equipment 17 would typically be pushed or pulled by either a road rail unit or a locomotive at the head or tail end of a string of gondola cars 18 on which a crawler unit or the like 19 could move or endeavour to unload railroad ties at their desired locations. It is foreseen that the drop location detection module 20 would be used by the operator of the actual tie distribution machine in order to make sure that they know exactly where and how many ties need to be dropped. FIG. 9 demonstrates the use of a secondary drop location detection module 46 installed in the locomotive 45.

It is contemplated that the primary drop location detection module 20 on the tie distribution equipment and the secondary drop location detection module 46 installed in the power unit 45 could communicate directly with each other for the purpose of exchanging their respective individual actual GPS co-ordinate locations. In this fashion, effectively the secondary drop location detection module 46 could locate the drop locations 26 by seeking out the same drop location co-ordinates 38 as the primary drop location detection module 20, but could apply to the calculation for location purposes an offset of the distance between the two modules (the distance from the power unit to the tie distribution machine 18). For example, if the distribution machine 19 was working at the far end of a train, 250 feet from the locomotive, the secondary drop location detection module 46 located in the locomotive 45 could basically move the distribution equipment 17 and more specifically the tie distribution machine 19 to the precise drop location co-ordinates 38 of a particular drop location 26 by applying effectively a 250 foot offset to the drop location co-ordinates 38 stored in the memory of the secondary drop location detection module 46.

Beyond storing the co-ordinates separately, it may even be the case that the secondary drop location detection module 46 did not contain a separate memory or GPS receiver and was basically a slave to the memory of the primary drop location detection module 20 and simply somehow received its information, wirelessly or in some other communicative fashion, from the primary module 20.

Effectively, then, in such a circumstance as the crawler machine 18 was moved down the top of the train and certain cars full of ties were exhausted, the primary drop location detection module 20 and the secondary drop location detection module 46 could, by virtue of their continued communication, automatically adjust the offset distance between the locomotive power unit 45 and the tie distribution machine 18. The obvious advantage to the offset functionality of using two drop location detection modules is that basically the driver of the power unit 45 would have their own relatively accurate readout of the proper location for a stop of the train while ties were to be distributed. In the absence of a separate readout in the power unit 45, the tie distribution machine 19 would somehow need to have direct control of the movement of the entire tie distribution train, while alternatively the operators and tie distribution machine and the locomotive would all need to be in constant radio contact.

If a secondary drop location detection module 46 of the type outlined herein were present or available in the power unit 45, then the operator of the power unit 45 could basically know as they drove the train down the tracks the right places to stop at a particular drop location 26, and by stopping the train at what their secondary drop location detection module 46 indicated was a drop location 26, the remainder of the distribution equipment 17, including the tie distribution machine 19 should be, at that point in time, located in relatively close proximity to the actual precise co-ordinates 38 of the drop location 26 at which the ties were to be dropped. In addition, communication between those two modules could include the fact that the locomotive or driver of the train would know how many more ties were to be dropped at a particular location or would somehow have their own indication of when tie distribution tasks were finished and it was safe to move forward to the next location.

Basically the secondary drop location detection module 46 could basically be a secondary readout driven by the primary module 20 on the actual distribution machine 19, or could be a separately equipped GPS enabled unit that could exercise more elaborate offset calculations and independent location of the drop locations 26 for the operator of the power unit.

Retrofitting the System of the Present Invention to Existing Equipment:

It is contemplated that the system of the present invention could either be built into railway maintenance equipment or alternatively could be retrofitted to existing equipment.

For example, with respect to the use location capture module 4, it will be understood that the device 4 could be built into some type of a track inspection vehicle or the like or even a tie marking module as discussed under the heading of "Use location capture module" above, and on that basis the use location capture module 4 could be integrated into one or more track inspection units by a particular railroad or railway maintenance company. Alternatively, it may also be the case that the use location capture module 4 is a handheld device which could be effectively used by one or more individual track inspectors, manually or otherwise inspecting a railway. Effectively the handheld device would be easily accomplished give the size of GPS electronics which are available on the market today, and all that would need to be done would be to take a mobile GPS receiver and combine with it the necessary additional electronics to accomplish some type of a basic user interface to trigger the capture of use location co-ordinates 37 as well as a memory 8 to store these co-ordinates 37 for eventual upload to the central computer 10. Practically speaking, it is foreseen that either a handheld unit or a backpack unit or something along these lines could quite easily be created for use in situations where it was desired to have a handheld or manual unit available for use as the use location capture module 4.

It will be understood that both the building in of the use location capture module 4 into some type of a track inspection or tie marking module or vehicle is contemplated within the scope of the present invention, as well as the creation of a handheld or otherwise portable unit which could be used by one or more individuals in the use location marking aspect of the method of the present invention.

The use location capture module 4 then can be rendered either portable or retrofitted to an existing or new track inspection vehicle. The second item which can also be retrofitted to existing equipment or built into new equipment would be the drop location detection module 20, which would effectively be responsible for the download of the drop location co-ordinates 38 and other remaining or related data from the central computer 10 and the database 16 hosted therein. The drop location detection module 20 and any associated user interface could be built into a new tie distribution unit or materials distribution train or unit for use by a railway, or alternatively could be again designed in such a fashion as to be retrofitted onto existing equipment. Insofar as the module 20 itself again consists of a basic user interface and a GPS receiver, it is easily foreseeable that something in either a handheld or briefcase size or style could be designed which could be retrofitted into existing tie distribution equipment.

CONCLUSION

While the description herein has been directed to explaining the adaptive distribution system and method of the present invention in relation to the distribution of railroad maintenance applications, it will be understood that the system and method of the present invention could also be used with attendant modifications to the data capture function or the distribution equipment to distribute materials other than railroad ties in similar applications. It will be understood that any such modifications and resulting embodiments are also contemplated within the scope of the present invention.

Distribution of any material in varying amounts along a roughly predetermined course that can be followed by both a data capture unit as well as the subsequent distribution equipment and/or personnel would lend itself to the use of the present invention. For example, beyond railroad maintenance tasks which are obviously an ideal candidate for the use of such a method another similar application might be the use of the system and method of the present invention in road maintenance applications. Again the data capture unit could be taken along a particular stretch of road and used to capture location and quantity information for materials to be distributed, and then a distribution unit could follow at a later time down the same piece of road and drop the right required quantities of materials in their use locations. Again it will be understood that this type of a use for the method of the present invention is also contemplated within the scope of the present invention, as would any attendant required modifications—for example, the distribution equipment would become truck mounted rather than train mounted, in all likelihood, but could still function equivalently beyond these modifications.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of distribution of materials along a railroad, said method comprising:
   a. With respect to a section of railroad track, identifying at least one use location in proximity to the railroad track at which a quantity of materials is required to be used;
   b. Using at least one drop location detection module capable of communicating with a central location database and capable of determining the location of the drop location detection module in relation to the railroad track, determining and capturing the coordinates of each use location in relation to the railroad track;
   c. Recording each set of use location coordinates to the central location database;
   d. Using a location selection software component, and based upon the use location coordinates stored within the central database as well as a profile of rules relating to the optimized distribution of the materials in question:
      i. selecting at least one drop location at which materials can be placed in proximity to the railroad track, wherein each drop location corresponds to at least one use location from the central database in relation to the railroad track in question and wherein each use location from the central database in relation to the railroad track in question corresponds to a drop location;
      ii. determining the coordinates in relation to the railroad track for each drop location, being drop location coordinates,
      iii. determining the appropriate quantity of materials to be placed at each drop location, being the drop location quantity, wherein the drop location quantity for a particular drop location denotes a sufficient quantity of material to meet the requirements at each use location to which the drop location in question corresponds;
   e. using materials distribution equipment equipped with a drop location detection module capable of communicating with the central location database, and capable of determining the location of the drop location detection module in relation to the railroad track:
      i. while moving the materials distribution equipment along the railroad track, monitoring the location of the drop location detection module in relation to the railroad track and comparing the location of the drop location detection module to the drop location coordinates in respect of drop locations along the railroad track selected by the location selection software component;
      ii. when it is determined that the drop location detection module has reached a drop location, causing the placement of the drop location quantity of materials at the drop location.

2. The method of claim 1 wherein the drop location coordinates and drop location quantities are stored in the central location database.

3. The method of claim 2 wherein the location selection software component is resident upon and the drop location coordinates and drop location quantities are calculated by the device on which the central location database is resident.

4. The method of claim 1 wherein the central location database is resident on the drop location detection module, and the drop location detection module is capable of communicating with the drop location detection module to access data from the central location database.

5. The method of claim 1 wherein the central location database is resident on the drop location detection module, and the drop location detection module is capable of communicating with the drop location detection module to access data from the central location database.

6. The method of claim 1 wherein the central location database is resident on a central computer, and wherein both the drop location detection modules and drop location detection modules are capable of communicating with the central computer for the purpose of communicating with the central location database.

7. The method of claim 2 wherein the location selection software component is resident upon and drop location coordinates and drop location quantities are calculated by the drop location detection module in advance of storage to the central location database.

8. The method of claim 2 wherein the location selection software component is resident upon and drop location coordinates and drop location quantities are calculated by the drop location detection module, and wherein the use location coordinates which are necessary for these calculations are downloaded or accessible to said drop location detection module.

9. The method of claim 8 wherein the drop locations are selected and the drop location coordinates and drop location quantities are computed in real time as the materials distribution equipment moves down the railroad track.

10. The method of claim 1 wherein the number of drop locations is less than the number of use locations and wherein at least one drop location corresponds to more than one use location, being a multiple drop location, resulting in the placement of materials for use at more than one use location at each such multiple drop location.

11. The method of claim 1 wherein the number of drop locations is the same as the number of use locations.

12. The method of claim 1 wherein a single drop location is determined and sited in relation to multiple use locations.

13. The method of claim 1 wherein the drop location detection module is equipped with a GPS receiver, and wherein the use location coordinates of a particular use location are captured by capturing the GPS position of the device at the use location.

14. The method of claim 1 wherein the drop location coordinates which are determined in respect of the drop locations are coordinates which are identifiable by a drop location detection module equipped with a GPS receiver, and wherein said drop location detection module contains a GPS receiver which can identify said drop locations based upon said drop location coordinates.

15. The method of claim 1 wherein use location coordinates are determined as measurements from a fixed point along the railroad, and wherein the drop location detection module is capable of measuring along the railroad from said fixed point and capturing said measurement in respect of a use location once identified.

16. The method of claim 1 wherein the drop location coordinates which are determined in respect of the drop locations are coordinates which are identifiable by measuring along the railroad from a fixed point, and wherein said drop location detection module is capable of measuring along the railroad from a fixed point and can identify said drop locations on this basis.

17. The method of claim 1 wherein use location coordinates are determined by counting ties from a fixed point along the railroad, and wherein the drop location detection module is capable of counting ties along the railroad from said fixed point and capturing said count in respect of a use location once identified.

18. The method of claim 1 wherein the drop location coordinates which are determined in respect of the drop locations are coordinates which are identifiable by counting ties along the railroad from a fixed point, and wherein said drop location detection module is capable of counting ties along the railroad from a fixed point and can identify said drop locations on this basis.

19. The method of claim 1 wherein more than one type of materials is to be distributed, and wherein the drop location detection module allows the operator thereof to specify quantities or types of such materials to be placed at each such use location, said quantities or types of materials to be placed being stored in the central location database along with the use location coordinates.

20. The method of claim 19 wherein a drop location is selected to correspond to each quantity of each material required at each use location, and wherein the drop locations for each different material may vary.

21. The method of claim 1 wherein the materials being distributed are replacement ties.

22. The method of claim 21 wherein the materials distribution equipment includes a picker arm for removal of such replacement ties from a transport railcar for placement at use locations.

23. The method of claim 22 further comprising a load cell on the picker arm capable of measuring the number of ties removed from the railcars at one time.

24. The method of claim 1 wherein the materials being distributed are ballast.

25. The method of claim 1 further comprising measuring materials as they are placed at a drop location.

26. The method of claim 1 wherein the materials are distributed automatically upon reaching a drop location.

27. The method of claim 1 wherein materials are distributed manually upon the arrival of the materials distribution equipment at a drop location.

28. The method of claim 27 further comprising notifying the operator of the materials distribution equipment when the drop location detection module has determined that the materials distribution equipment has reached a drop location.

29. The method of claim 28 further comprising notifying the operator of the materials distribution equipment of the drop location quantity in respect of a drop location as it is reached.

30. The method of claim 27 wherein the drop location detection module further comprises a slave display on the power unit of the distribution equipment, to advise the operator of the power unit when the distribution equipment is in position at a drop location in addition to advising the operator of the distribution equipment.

31. The method of claim 1 wherein the drop location coordinates of a drop location can be captured by the drop location detection module rather than calculated by the location selection software component.

32. The method of claim 24 wherein the distribution equipment automatically dispenses the predetermined drop location quantity of materials at each drop location.

33. The method of claim 1 wherein the dispensing of the predetermined drop location quantity of materials at each drop location is accomplished by notifying the operator of the distribution equipment of the drop location and the drop location quantity, and wherein the operator of the distribution equipment can then effect the dispensing of the drop location quantity of materials.

34. The method of claim 1 wherein upon determining proximity to a drop location, the drop location detection module will notify the operator of the distribution equipment.

35. A system for use in the adaptive distribution of variable quantities of materials along a railroad track, said system comprising:
   a. A central location database capable of storing the coordinates in relation to the railroad track of use locations at which materials are required for use;
   b. At least one drop location detection module which is able to determine its coordinates in relation to the railroad track and capture said coordinates as use location coordinates corresponding to a use location, and wherein said drop location detection module is capable of communicating with the central location database for the purpose of storing use location coordinates therein;
   c. A location selection software component which will select drop locations in proximity to the railroad track at which materials are to placed and will determine the coordinates of such drop locations in relation to the railroad track, being drop location coordinates, along with determining the quantity of materials to be placed at each drop location, being drop location quantities;
   d. At least one piece of materials distribution equipment equipped with a drop location detection module capable of communicating with the central location database to access location coordinates stored thereon as well as being capable of determining its own position in relation to the railroad track;
   Wherein in operation of the system, use location coordinates of use locations in relation to the railroad track will be captured to the central location database by the at least one drop location detection module;

And wherein the location selection software component will select drop locations and generate the drop location coordinates and drop location quantities corresponding thereto based upon use location coordinates and a profile of rules pertaining to the optimal distribution of the materials in question;

And wherein the drop location detection module on the materials distribution equipment will access the drop location coordinates and drop location quantities in respect of the railroad track and monitor or compare the location of the drop location detection module in relation to the railroad track against the drop location coordinates as the materials distribution equipment is moved along the railroad track, and upon determining that a drop location has been reached the materials distribution equipment will place the required drop location quantity of materials at that drop location.

36. The system of claim 35 further comprising a central computer in which the central location database is resident, said central computer being capable of communicating with the at least one drop location detection module as well as with the at least one drop location detection module.

37. The system of claim 35 wherein the location selection software component is resident upon the central computer.

38. The system of claim 35 wherein the central location database is resident upon the at least one drop location detection module, and the at least one drop location detection module is capable of communicating with the drop location detection module to access location coordinates and data stored within the central location database.

39. The system of claim 38 wherein the location selection software component is resident upon the drop location detection module and drop location coordinates and drop location quantities are calculated by the drop location detection module in advance of storage to the central location database.

40. The system of claim 35 wherein the central location database is resident upon the at least one drop location detection module, and the at least one drop location detection module is capable of communicating with the drop location detection module to store use location coordinates and data to the central location database.

41. The system of claim 40 wherein the location selection software component is resident upon the drop location detection module and drop location coordinates and drop location quantities are calculated by the drop location detection module, and wherein the use location coordinates which are necessary for these calculations are downloaded or accessible to said drop location detection module.

42. The system of claim 35 wherein the drop location coordinates and drop location quantities are stored in the central location database.

43. The system of claim 35 wherein the location selection software component is resident upon and the drop location coordinates and drop location quantities are calculated by the device on which the central location database is resident.

44. The system of claim 35 wherein the drop locations are selected and the drop location coordinates and drop location quantities are computed in real-time as the materials distribution equipment moves down the railroad track.

45. The system of claim 35 wherein the drop location detection module is equipped with a GPS receiver, and wherein the use location coordinates of a particular use location are the GPS position of the device at the use location.

46. The system of claim 35 wherein the drop location coordinates which are determined in respect of the drop locations are coordinates which are identifiable by a drop location detection module equipped with a GPS receiver, and wherein said drop location detection module contains a GPS receiver which can identify said drop locations based upon said drop location coordinates.

47. The system of claim 35 wherein use location coordinates are determined as measurements from a fixed point along the railroad, and wherein the drop location detection module is capable of measuring along the railroad from said fixed point and capturing said measurement in respect of a use location once identified.

48. The system of claim 35 wherein the drop location coordinates which are determined in respect of the drop locations are coordinates which are identifiable by measuring along the railroad from a fixed point, and wherein said drop location detection module is capable of measuring along the railroad from a fixed point and can identify said drop locations on this basis.

49. The system of claim 35 wherein use location coordinates are determined by counting ties from a fixed point along the railroad, and wherein the drop location detection module is capable of counting ties along the railroad from said fixed point and capturing said count in respect of a use location once identified.

50. The system of claim 35 wherein the drop location coordinates which are determined in respect of the drop locations are coordinates which are identifiable by counting ties along the railroad from a fixed point, and wherein said drop location detection module is capable of counting ties along the railroad from a fixed point and can identify said drop locations on this basis.

51. The system of claim 35 wherein more than one type of materials is to be distributed, and wherein the drop location detection module allows the operator thereof to specify quantities or types of such materials to be placed at each such use location, said quantities or types of materials to be placed being stored in the central location database along with the use location coordinates.

52. The system of claim 35 wherein the drop location detection module will notify the operator of the materials distribution equipment when it has determined that the materials distribution equipment has reached a drop location.

53. The system of claim 35 wherein the drop location detection module on at least one piece of materials distribution equipment further comprises a slave display on the power unit of the distribution equipment, to advise the operator of the power unit when the distribution equipment is in position at a drop location in addition to advising the operator of the distribution equipment.

54. The system of claim 35 wherein the drop location detection module is capable of capturing the drop location coordinates of a drop location based on an operator triggering same.

55. A drop location detection module for use in a method of adaptive distribution of variable quantities of materials along a railroad track, the drop location detection module comprising a device equipped to measure the location of the drop location detection module in relation to the railroad track, and having a memory capable of storing coordinates in relation to the railroad track for use locations for materials to be distributed upon triggering of such a coordinate capture by the operator thereof, said coordinates being use location coordinates, and wherein said drop location detection module is capable of storing use location coordinates to a central location database for subsequent use in the selection of optimal drop locations for materials to be placed.

* * * * *